United States Patent
Fukagawa

(10) Patent No.: US 9,646,641 B2
(45) Date of Patent: May 9, 2017

(54) COMPOSITION FOR MAGNETIC RECORDING MEDIUM AND MAGNETIC RECORDING MEDIUM

(71) Applicant: FUJIFILM CORPORATION, Minato-ku, Tokyo (JP)

(72) Inventor: Reiko Fukagawa, Minami-ashigara (JP)

(73) Assignee: FUJIFIM Corporation, Tokyo (JP)

( * ) Notice: Subject to any disclaimer, the term of this patent is extended or adjusted under 35 U.S.C. 154(b) by 0 days.

(21) Appl. No.: 14/498,355

(22) Filed: Sep. 26, 2014

(65) Prior Publication Data

US 2015/0093599 A1    Apr. 2, 2015

(30) Foreign Application Priority Data

Sep. 27, 2013  (JP) ................. 2013-202608
Sep. 26, 2014  (JP) ................. 2014-196936

(51) Int. Cl.
| | | |
|---|---|---|
| G11B 5/708 | (2006.01) | |
| G11B 5/70 | (2006.01) | |
| G11B 5/702 | (2006.01) | |
| G11B 5/706 | (2006.01) | |

(52) U.S. Cl.
CPC .......... *G11B 5/7013* (2013.01); *G11B 5/7022* (2013.01); *G11B 5/70678* (2013.01)

(58) Field of Classification Search
None
See application file for complete search history.

(56) References Cited

U.S. PATENT DOCUMENTS

| | | |
|---|---|---|
| 8,808,947 B2 | 8/2014 | Takahashi et al. |
| 8,921,018 B2 | 12/2014 | Takahashi et al. |
| 2010/0046117 A1* | 2/2010 | Abe ........................ G11B 5/70 360/134 |
| 2010/0233595 A1 | 9/2010 | Takahashi et al. |
| 2010/0239891 A1 | 9/2010 | Omura et al. |
| 2012/0196156 A1 | 8/2012 | Suzuki |
| 2014/0175348 A1 | 6/2014 | Takahashi et al. |

FOREIGN PATENT DOCUMENTS

| | | |
|---|---|---|
| JP | 10-143844 A | 5/1998 |
| JP | 2007-277514 A | 10/2007 |
| JP | 2010-222445 A | 10/2010 |
| JP | 2011-216149 A | 10/2011 |
| JP | 2012-155805 A | 8/2012 |

OTHER PUBLICATIONS

Office Action dated Aug. 25, 2015, from the Japanese Patent Office in counterpart Japanese Application No. 2014-196936.

* cited by examiner

*Primary Examiner* — Holly Rickman
*Assistant Examiner* — Linda Chau
(74) *Attorney, Agent, or Firm* — Sughrue Mion, PLLC

(57) ABSTRACT

The magnetic coating composition for a magnetic recording medium comprises:

(A) a compound denoted by formula (1) having a weight average molecular weight of equal to or less than 20,000:

$$(A^1-R^2-S)n\text{-}R^1-(P^1)m \quad (1)$$

wherein, in formula (1), $R^1$ denotes an organic connecting group with a valence of (m+n); $R^2$ denotes a single bond or divalent organic connecting group; $A^1$ denotes a functional group selected from the group consisting of an acidic group, a basic group, and a hydroxyl group; m denotes an integer ranging from 1 to 8 and n denotes an integer ranging from 1 to 9, with m+n ranging from 3 to 10; each of n instances of $A^1$ and $R^2$ can be independently different or identical; $P^1$ denotes a polymer backbone; and m instances of $P^1$ can be identical or different;

(B) binder;
(C) ferromagnetic powder; and
(D) solvent.

15 Claims, No Drawings

COMPOSITION FOR MAGNETIC RECORDING MEDIUM AND MAGNETIC RECORDING MEDIUM

CROSS-REFERENCE TO RELATED APPLICATIONS

This application claims priority under 35 U.S.C 119 to Japanese Patent Application No. 2013-202608 filed on Sep. 27, 2013 and Japanese Patent Application No. 2014-196936 filed on Sep. 26, 2014. Each of the above applications is hereby expressly incorporated by reference, in its entirety.

BACKGROUND OF THE INVENTION

Field of the Invention

The present invention relates to a magnetic coating composition for a magnetic recording medium and to a magnetic recording medium.

Discussion of the Background

Means of transmitting information at high speeds have undergone marked development in recent years, rendering possible the transmission of data and images containing huge amounts of information. As data transmission technology has improved, ever higher density recording has been demanded of magnetic recording media and magnetic recording and reproduction devices for recording, reproducing and storing information.

In high density recording, effective ways of obtaining good electromagnetic characteristics include employing fine particles of ferromagnetic powder, dispersing fine particles of ferromagnetic powder with increased dispersibility to increase the smoothness of the surface of the magnetic layer.

For example, the introduction of a branched structure to the side chain of binder is proposed in Japanese Unexamined Patent Publication (KOKAI) No. 2011-216149 which is expressly incorporated herein by reference in its entirety, as a means of increasing the dispersibility of the powder, such ferromagnetic powder, that is used in a magnetic recording medium.

SUMMARY OF THE INVENTION

As set forth above, increasing the dispersibility of the ferromagnetic powder is an effective means of increasing recording density. However, in the manufacturing of particulate magnetic recording media, even assuming that it is possible to prepare a coating composition in which ferromagnetic powder has been dispersed with increased dispersibility by dispersion processing, the aggregation of the ferromagnetic powder during the period from when the coating composition is prepared to when it is actually coated on a nonmagnetic support to form a coating makes it difficult to obtain a magnetic recording medium with good surface smoothness. Accordingly, a coating composition for forming a magnetic layer on a magnetic recording medium should be maintained in a stable state of dispersion (have good dispersion stability) in addition to increasing the dispersibility of the ferromagnetic powder.

An aspect of the present invention provides for a means of increasing the dispersion stability and the dispersibility of the ferromagnetic powder for a magnetic recording medium.

The present inventor conducted extensive research. As a result, she discovered that it was possible to disperse ferromagnetic powder with increased dispersibility, and achieve dispersion that was stable for extended periods, by employing a component (A), described further below, having a branched structure as a component of a magnetic coating composition for a magnetic recording medium containing binder, ferromagnetic powder and solvent. The present inventor presumed that since component (A) comprised a steric repulsion group ($P^1$ in formula (1) further below) and an adsorption functional group ($A^1$ in formula (1)) as terminal functional groups, the adsorption functional group could efficiently adsorb to the surface of the particles of ferromagnetic powder and the steric hindrance group could spread out in the solvent, preventing aggregation between particles.

A dispersing agent having a branched structure is proposed as a dispersing agent in the form of a pigment for a color filter in Japanese Unexamined Patent Publication (KOKAI) No. 2007-277514 or English language family members US2010/233595A1, U.S. Pat. No. 8,808,947 and US2014/175348A1, which are expressly incorporated herein by reference in their entirety. However, there is no suggestion of dispersibility or dispersion stability, particularly dispersion stability, of the ferromagnetic powder for a magnetic recording medium.

The present invention was devised based on this discovery.

An aspect of the present invention relates to a magnetic coating composition, which is a magnetic coating composition for a magnetic recording medium and comprises the following components (A) to (D):

(A) a compound denoted by formula (1) below having a weight average molecular weight of equal to or less than 20,000:

$$(A^1\text{-}R^2\text{—}S)n\text{-}R^1\text{—}(P^1)m \qquad (1)$$

wherein, in formula (1), $R^1$ denotes an organic connecting group with a valence of (m+n); $R^2$ denotes a single bond or divalent organic connecting group; $A^1$ denotes a functional group selected from the group consisting of an acidic group, a basic group, and a hydroxyl group; m denotes an integer ranging from 1 to 8 and n denotes an integer ranging from 1 to 9, with m+n ranging from 3 to 10; each of n instances of $A^1$ and $R^2$ can be independently different or identical; $P^1$ denotes a polymer backbone; and m instances of $P^1$ can be identical or different;

(B) binder;
(C) ferromagnetic powder; and
(D) solvent.

In an embodiment, the functional group denoted by $A^1$ is selected from the group consisting of a hydroxyl group, carboxyl group, phosphoric acid group, sulfonic acid group, amino group, and salts thereof.

In an embodiment, in formula (1), $R^2$ denotes a divalent organic connecting group comprised of one or a combination of two or more selected from the group consisting of —C(=O)—, an alkylene group with equal to or less than 12 carbon atoms and with an optionally branched or cyclic structure, an alkenylene group with equal to or less than 6 carbon atoms and with an optionally branched or cyclic structure, —O—, a phenylene group, and a halogen atom, that are made up of from 1 to 10 carbon atoms, from 0 to 10 oxygen atoms, from 0 to 10 halogen atoms, and from 1 to 30 hydrogen atoms.

In an embodiment, in formula (1), $P^1$ is a residue of a copolymer or a polymer of a vinyl monomer.

In an embodiment, in formula (1), $P^1$ is a residue of a copolymer or a polymer of a (meth)acrylic acid ester.

In an embodiment, in formula (1), $R^1$ denotes an organic connecting group of valence (m+n) which is comprised of one or a combination of two or more selected from the group consisting of —C(=O)—O—, —O—, —C(=O)—NR—, wherein R denotes a hydrogen atom or an alkyl group with equal to or less than 4 carbon atoms, —O—C(=O)—NH—, a phenylene group, and an alkylene group having 1 to 30 carbon atoms.

In an embodiment, the above magnetic coating composition further comprises a curing agent.

In an embodiment, in formula (1), $P^1$ comprises a functional group capable of undergoing a crosslinking reaction with the curing agent.

In an embodiment, the functional group capable of undergoing a crosslinking reaction is selected from the group consisting of a hydroxyl group, amino group, phenol group, and carboxyl group.

In an embodiment, the curing agent is polyisocyanate.

In an embodiment, the acid number or the base number of component (A) is equal to or less than 224 mgKOH/g.

In an embodiment, component (C) is ferromagnetic powder with an average particle size ranging from 10 nm to 50 nm.

In an embodiment, component (C) is ferromagnetic hexagonal ferrite powder.

In an embodiment, component (C) is ferromagnetic metal powder.

In an embodiment, the above magnetic coating composition comprises 2 to 30 weight parts of component (A) per 100 weight parts of component (C).

In an embodiment, component (D) comprises ketone solvent.

In an embodiment, component (B) is selected from the group consisting of polyurethane resin and vinyl chloride resin.

A further aspect of the present invention relates to a magnetic recording medium, which comprises a magnetic layer formed of the above magnetic coating composition on a nonmagnetic support.

According to an aspect of the present invention, the dispersibility of ferromagnetic powder in a magnetic recording medium for high-density recording can be increased. The magnetic recording medium of an aspect of the present invention can exhibit high electromagnetic characteristics.

An aspect of the present invention can provide a magnetic recording medium with good running durability.

A further aspect of the present invention can provide a magnetic coating composition (dispersion) for a magnetic recording medium which maintains a dispersion state of ferromagnetic powder even when stored for extended periods.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

Composition for Magnetic Recording Medium

An aspect of the present invention relates to a magnetic coating composition for a magnetic recording medium (also referred to simply as the "composition", hereinafter) containing components (A) to (D) described in detail below.

The composition is employed as a coating material for forming the magnetic layer of a particulate magnetic recording medium, making it possible to obtain a magnetic recording medium affording good electromagnetic characteristics by forming a magnetic layer of the composition.

The composition will be described in greater detail below. In the present invention, the use of the word "to" in a numeric range means that the preceding and succeeding numbers constituting the numeric range are included as the minimum value and maximum value thereof, respectively. Unless specifically state otherwise, the groups that are given can be substituted or unsubstituted. When a given group comprises a substituent, the substituent can be, by way of example, an alkyl group (such as an alkyl group with 1 to 6 carbon atoms), a hydroxyl group, an alkoxy group (such as an alkoxy group with 1 to 6 carbon atoms), a halogen atom (such as a fluorine atom, chlorine atom, or bromine atom), a cyano group, an amino group, a nitro group, an acyl group, and a carboxyl group. With regard to a group having one or more substituents, the number of carbon atoms means the number of carbon atoms of the portion excluding the substituent.

Component (A)

Component (A) contained in the above composition is a compound denoted by formula (1) and having a weight average molecular weight of equal to or less than 20,000:

$$(A^1\text{-}R^2\text{—S})n\text{-}R^1\text{—}(P^1)m \quad (1)$$

(wherein, in formula (1), $R^1$ denotes an organic connecting group with a valence of (m+n); $R^2$ denotes a single bond or divalent organic connecting group; $A^1$ denotes a functional group selected from the group consisting of an acidic group, a basic group, and a hydroxyl group; m denotes an integer ranging from 1 to 8 and n denotes an integer ranging from 1 to 9, with m+n ranging from 3 to 10; each of n instances of $A^1$ and $R^2$ can be independently different or identical; $P^1$ denotes a polymer backbone; and m instances of $P^1$ can be identical or different).

In component (A), the function group denoted by $A^1$ in formula (1) can function as an adsorption functional group adsorbing to the particle surface of the ferromagnetic powder, and the polymer backbone denoted by $P^1$ can function as a steric repulsion group. The present inventor assumes that as a result, a good dispersion state of ferromagnetic powder in solvent can be achieved, and that the good dispersion state can be stably maintained for extended periods.

Component (A) will be described in detail below.

<Weight Average Molecular Weight>

Component (A) is a compound with a weight average molecular weight of equal to or less than 20,000. In high molecular weight compounds with weight average molecular weights exceeding 20,000, it is difficult to maintain a stable dispersion state of ferromagnetic powder for extended periods. This is presumed by the present inventor to be because in a compound with a weight average molecular weight exceeding 20,000, crosslinking between particles of the ferromagnetic powder may cause the compound to aggregate (undergo crosslinking aggregation). From the perspective of further enhancing dispersion stability, the weight average molecular weight of component (A) is desirably equal to or less than 15,000, preferably equal to or less than 10,000. From the perspective of running durability, the weight average molecular weight of component (A) is desirably equal to or more than 800, preferably equal to or more than 1,000, and more preferably, equal to or more than 1,200.

The average molecular weight in the present invention refers to a value obtained by the measurement by gel permeation chromatography (GPC) with standard polystyrene conversion. The measurement condition of GPC can be, for example, the following condition. The weight average molecular weights given in Examples below are the values measured by GPC under the following measurement condition and obtained with standard polystyrene conversion.

GPC apparatus: HLC-8220 (made by Tosoh)
Guard column: TSKguardcolumn Super HZM-H
Column: TSKgel Super HZ 2000,TSKgel Super HZ 4000, TSKgel Super HZ-M (made by Tosoh, 4.6 mm (inner diameter)×15.0 cm, three columns connected serially)
Eluent: Tetrahydrofuran (THF) containing stabilizer (2,6-di-t-butyl-4-methylpheno)
Flow rate of eluent: 0.35 mL/min.
Column temperature: 40° C.
Inlet temperature: 40° C.
Refractive index (RI) measurement temperature: 40° C.
Sample concentration: 0.3 weight percent
Sample injection amount: 10 μL <Formula (1)>

As set forth above, formula (1) is as follows:

(1)

$A^1$ denotes a functional group selected from the group consisting of an acidic group, a basic group, and a hydroxyl group. In formula (1), n is an integer ranging from 1 to 9. Thus, in component (A), one or more units of the above functional group are present at a terminal position. The terminal functional group can function as an adsorption functional group by adsorbing to the particle surface of the ferromagnetic powder. When two or more instances of $A^1$ are present in formula (1) (when n denotes an integer of equal to or more than 2), the multiple instances of the functional group denoted by $A^1$ can be identical or different.

The acidic group refers to a group that is capable of releasing $H^+$ in water or solvent containing water (an aqueous solvent) and dissociating into an anion, and is not specifically limited beyond that it be an acidic group. Examples are a carboxyl group, a sulfonic acid group, a phosphoric acid group, and a phenol group. From the perspective of further enhancing dispersion, a carboxyl group, a sulfonic acid group, or a phosphoric group is desirable. The carboxyl group (—COOH) can be in the form of a salt (—COOM, where M denotes a cation such as an alkali metal ion). The same applies to the other functional groups.

The basic group refers either to a group that can dissociate into a cation in water or aqueous solvent, or to a group that can pick up an $H^+$ and become a cation, and is not specifically limited beyond that it be a basic group. Examples are an amino group, a guanidyl group, an amidyl groups, and an ammonium salt. From the perspective of further enhancing dispersion, an amino group is desirable. The amino group can be substituted or unsubstituted; is a primary, secondary, or tertiary amino group; and is desirably a tertiary amino group. In a substituted amino group, the substituent that is substituted for a hydrogen atom can be, for example, a linear, branched, or cyclic alkyl group with 1 to 10 carbon atoms.

Examples of substituents that are preferred as $A^1$ from the perspective of further enhancing dispersibility are substituents selected from the groups consisting of a hydroxyl group, a carboxyl group, a phosphoric acid group, a sulfonic acid group, an amino group (desirably tertiary amino groups), and salts thereof. A carboxyl group, a hydroxyl group, and a tertiary amine group are preferred.

From the perspective of enhancing dispersibility, dispersion stability, and running durability, the acid number or base number of component (A) is desirably equal to or less than 224 mgKOH/g, preferably equal to or less than 168 mgKOH/g. From the perspective of enhancing dispersibility and dispersion stability, the acid number or base number of component (A) is desirably equal to or more than 5.6 mgKOH/g, preferably equal to or more than 11.2 mgKOH/g. The acid number or base number is a value that can be determined by the electric potential method (solvent: tetrahydrofuran/water=100/10 (volumetric ratio); titrant: 0.01 N sodium hydroxide aqueous solution (acid number), 0.01 N hydrochloric acid (base number)). The acid number and base number can be controlled by means of the number of acidic groups or basic groups contained in $A^1$ and other moieties.

$R^1$ denotes an organic connecting group of valence (m+n). The organic connecting group denoted by $R^1$ is comprised of, for example, one or a combination of two or more selected from the group consisting of —C(=O)—O—, —O—, —C(=O)—NR—, wherein R denotes a hydrogen atom or an alkyl group with equal to or less than 4 carbon atoms, —O—C(=O)—NH—, a phenylene group, and an alkylene group having 1 to 30 carbon atoms. $R^1$ can also contain a cyclic structure in a structure comprised of a combination of two or more selected from the above group. An example of a desirable structure in the organic connecting group denoted by $R^1$ is given below. In the structure given below, * denotes the bond position with the other structure.

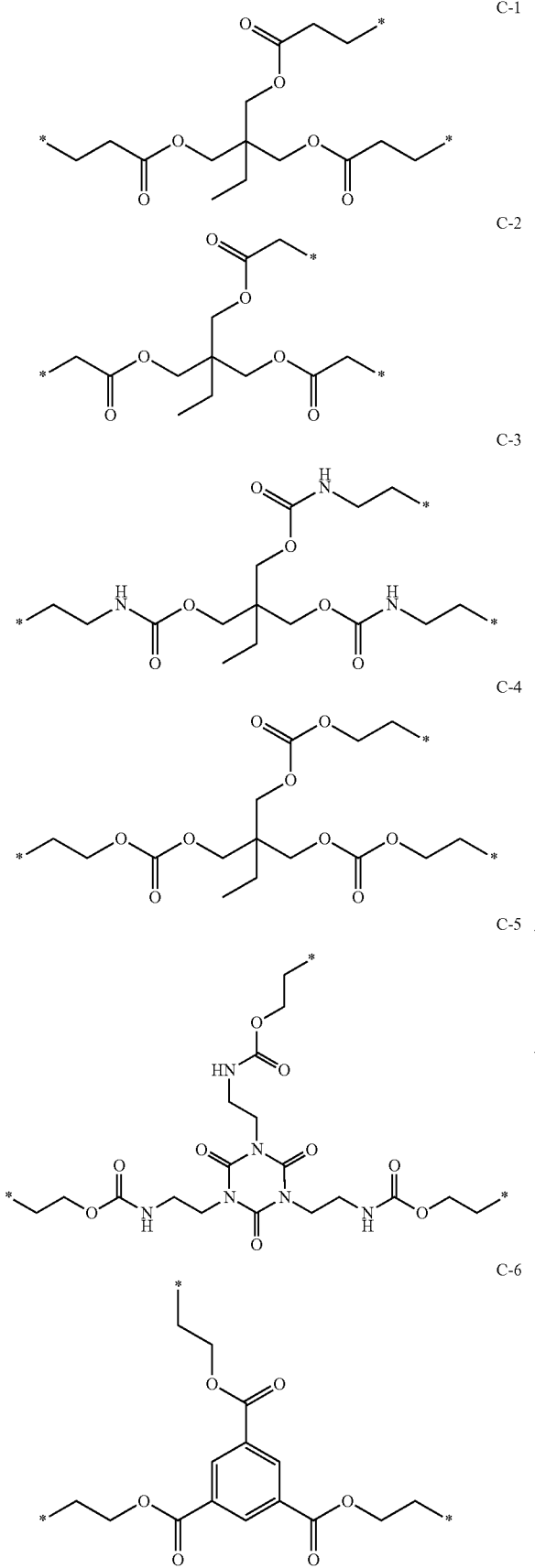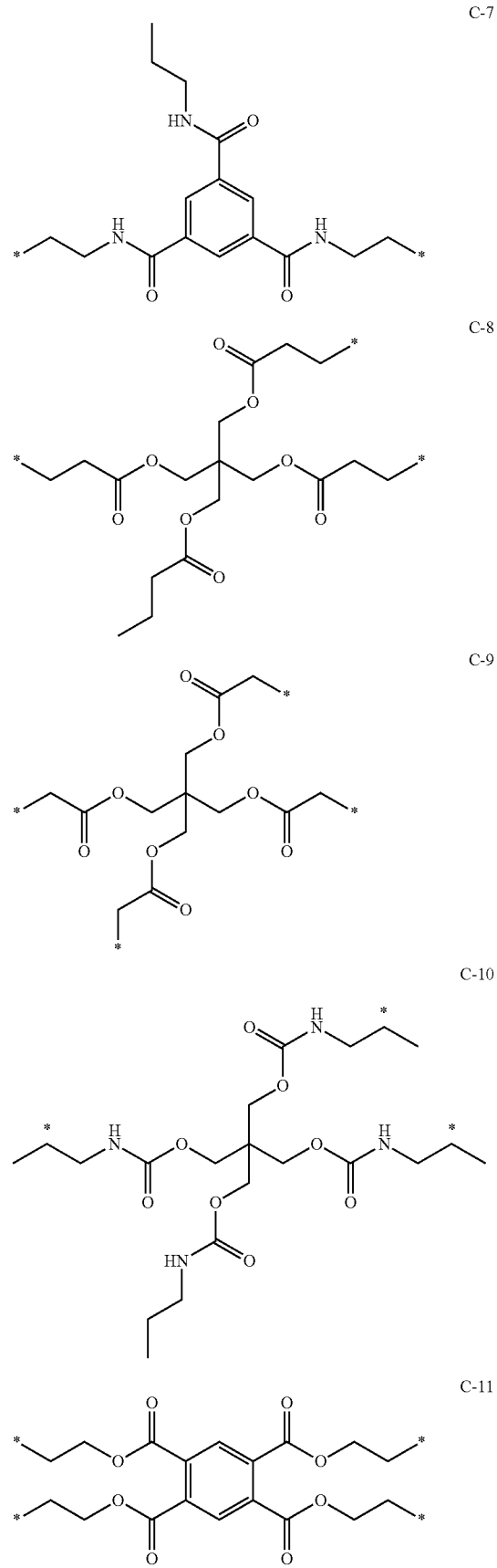

-continued

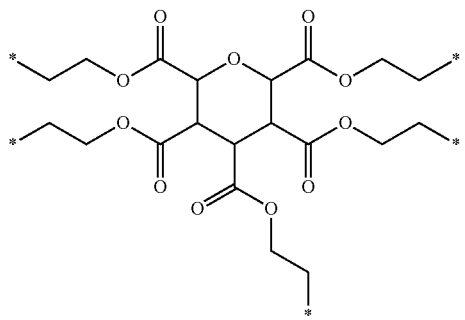
C-12

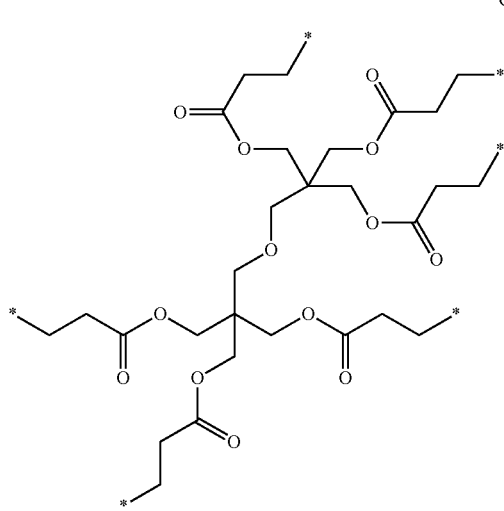
C-13

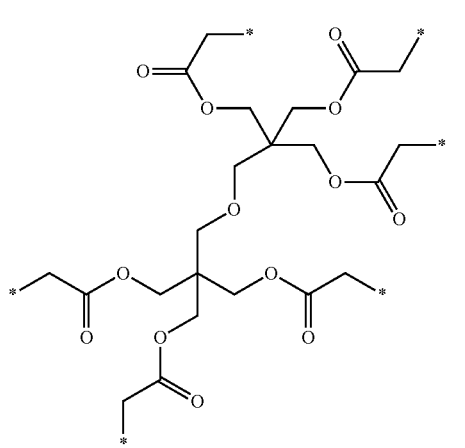
C-14

In formula (1), $R^2$, which is connected with $R^1$ through sulfur atoms S, denotes a single bond or a divalent organic connecting group. When n in formula (1) denotes an integer of two or more, the multiple instances of $R^2$ can be identical or different. A divalent organic connecting group is desirable as $R^2$. A divalent organic connecting group that is comprised of one, or a combination of two or more, selected from the group consisting of —C(=O)—, an alkylene group with equal to or less than 12 carbon atoms and with an optionally branched or cyclic structure, an alkenylene group with equal to or less than 6 carbon atoms and with an optionally branched or cyclic structure, —O—, a phenylene group, and a halogen atom, that are made up of from 1 to 10 carbon atoms, from 0 to 10 oxygen atoms, from 0 to 10 halogen atoms, and from 1 to 30 hydrogen atoms, is preferred. The structure below is of even greater preference. In the structure below, * denotes the position of a bond with another structure.

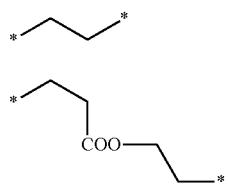
T-1

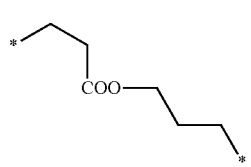
T-2

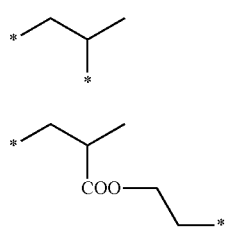
T-3

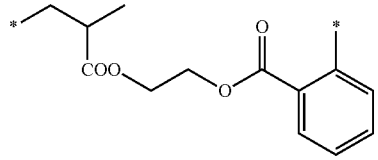
T-4

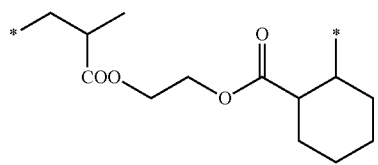
T-5

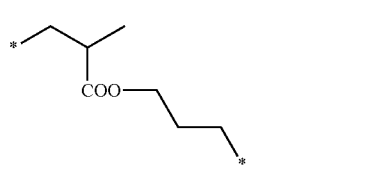
T-6

T-7

T-8

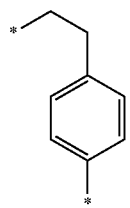
T-9

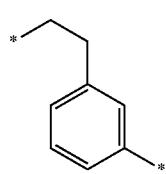
T-10

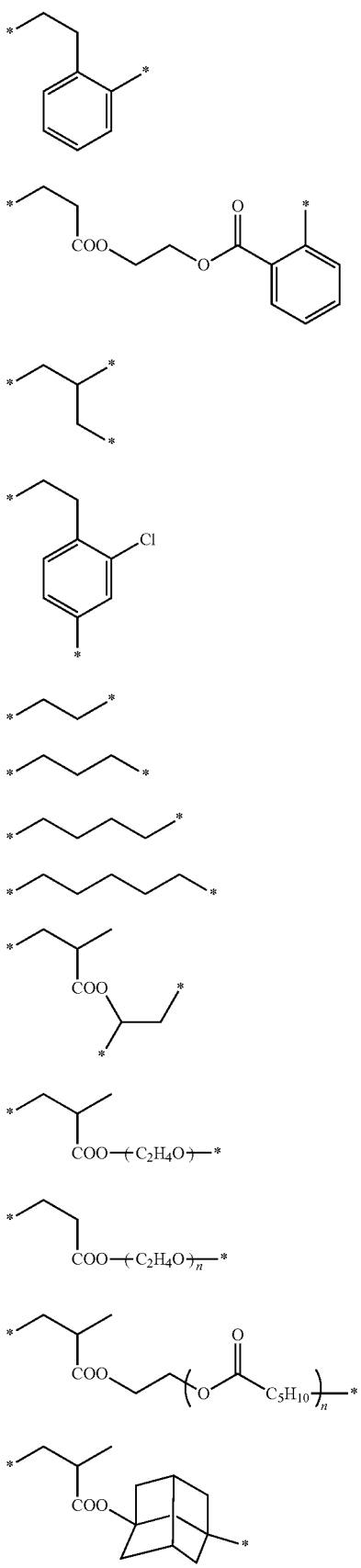

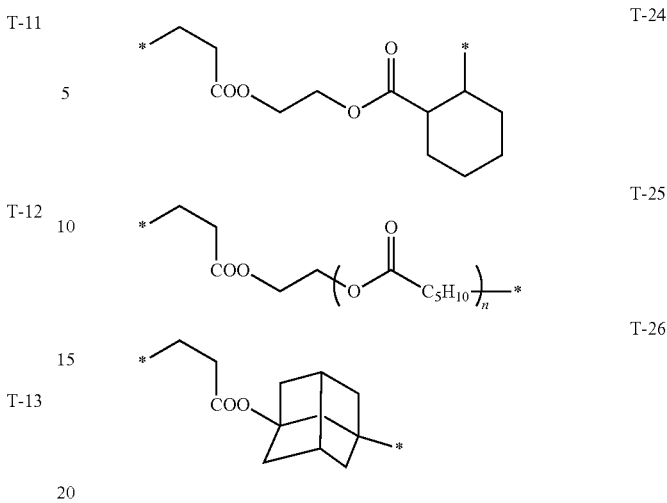

P[1] denotes a polymer backbone. In the present invention, the term "polymer backbone" means one that is formed by repeated bonding of specific structural units. Since such a structure can function as a steric repulsion group, dispersibility and dispersion stability can be increased by inhibiting aggregation between particles of ferromagnetic powder in the solvent.

In the compound denoted by formula (1), the polymer backbone can be obtained by introducing the portion of the structure of formula (1) denoted by "(A$^1$-R$^2$—S)n-R$^1$—" onto the end or a side chain of a known polymer. Accordingly, the polymer backbone denoted by P$^1$ in formula (1) can be a polymer residue. The polymer (hereinafter, the term "polymer" is used to include both polymers (homopolymers) and copolymers) is not specifically limited beyond that it be a known polymer. Examples of desirable polymers are at least one selected from the group consisting of polymers and copolymers of vinyl monomers, ester polymers, ether polymers, urethane polymers, amide polymers, epoxy polymers, silicone polymers, modified products thereof, and copolymers (such as polyether/polyurethane copolymers, copolymers of polymers of polyether/vinyl monomers, and the like (in the form of any one of random copolymers, block polymers, and graft polymers)). One or more selected from the group consisting of polymers or copolymers of vinyl monomers, ester polymers, ether polymers, urethane polymers, modified products thereof, and copolymers thereof are preferred, and polymers or copolymers of vinyl monomers are of even greater preference.

The above vinyl monomers are not specifically limited. Desirable examples are (meth)acrylic acid esters, crotonic acid esters, vinyl esters, maleic acid diesters, fumaric acid diesters, itaconic acid diesters, (meth)acrylamide esters, styrenes, vinyl ethers, vinyl ketones, olefins, maleimides, (meth)acrylonitriles, and vinyl monomers with acidic groups. In the present invention, the term (meth)acryl is used to include both acryl and methacryl. Among the above vinyl monomers, examples of monomers that are desirable from the perspective of achieving further increased dispersibility and dispersion stability are the (meth)acrylic acid esters.

Examples of (meth)acrylic acid esters are: methyl(meth)acrylate, ethyl(meth)acrylate, n-propyl(meth)acrylate, isopropyl(meth)acrylate, n-butyl(meth)acrylate, isobutyl(meth)acrylate, t-butyl(meth)acrylate, amyl(meth)acrylate, n-hexyl(meth)acrylate, cyclohexyl(meth)acrylate, t-butyl cyclohexyl(meth)acrylate, 2-ethylhexyl(meth)acrylate, t-octyl(meth)acrylate, dodecyl(meth)acrylate, octadecyl(meth) acrylate, acetoxyethyl(meth)acrylate, phenyl(meth)acrylate, 2-hydroxyethyl(meth)acrylate, 2-hydroxypropyl(meth)acrylate, 3-hydroxypropyl(meth)acrylate, 4-hydroxybutyl(meth) acrylate, 2-methoxyethyl(meth)acrylate, 2-ethoxyethyl (meth)acrylate, 2-(2-methoxyethoxy)ethyl(meth)acrylate, 3-phenoxy-2-hydroxypropyl(meth)acrylate, 2-chloroethyl (meth)acrylate, glycidyl(meth)acrylate, 3,4-epoxycyclohexylmethyl(meth)acrylate, vinyl(meth)acrylate, 2-phenylvinyl (meth)acrylate, 1-propenyl(meth)acrylate, allyl (methacrylate), 2-allyloxyethyl(meth)acrylate, propargyl (meth)acrylate, benzyl(meth)acrylate, diethylene glycol monomethyl ether(meth)acryate, diethylene glycol monoethyl ether(meth)acrylate, triethylene glycol monomethyl ether(meth)acrylate, triethylene glycol monoethyl ether (meth)acrylate, polyethylene glycol monomethyl ether (meth)acrylate, polyethylene glycol monoethyl ether(meth) acrylate, β-phenoxyethoxyethyl(meth)acrylate, nonylphenoxypolyethylene glycol(meth)acrylate, dicyclopentenyl(meth)acrylate, dicyclopentenyl oxyethyl(meth) acrylate, trifluoroethyl(meth)acrylate, octafluoropentyl (meth)acrylate, perfluorooctylethyl(meth)acrylate, dicyclopentanyl(meth)acrylate, tribromophenyl(meth)acrylate, tribromophenyl oxyethyl(meth)acrylate, and γ-butyrolactone (meth)acrylate.

Further examples of monomers are the various monomers described in Japanese Unexamined Patent Publication (KOKAI) No. 2007-277514, which is expressly incorporated herein by reference in its entirety, paragraphs 0090 to 0094. The repeating unit constituting the polymer backbone that is denoted by $P^1$ in formula (1) can be of one or more types.

In the particulate magnetic recording medium, a curing agent (crosslinking agent) can be employed as a component of the coating composition for forming a coating layer to form a crosslinked structure by inducing a curing reaction (crosslinking reaction) with other components and increasing the coating strength. In component (A), P1 in formula (1) can contain a functional group that is capable of undergoing a crosslinking reaction with such a curing agent. The functional group need only incorporate a suitable functional group that can react with a curing agent used in combination; examples are: a hydroxyl group, an amino group, a phenol group, and a carboxyl group. The hydrogen atoms (active hydrogen) that are contained in these groups will undergo a crosslinking reaction with isocyanate groups. Polyisocyanate is desirably employed as the curing agent. The details will be set forth further below.

The proportion of the functional groups reacting with the curing agent in the polymer backbone denoted by $P^1$ desirably falls within a range of 0.3 percent to 20 percent, preferably within a range of 0.5 percent to 15 percent, of the total 100 percent of $P^1$ based on weight. Setting within the above range can yield a magnetic layer with good dispersibility of ferromagnetic powder and high strength.

In formula (1), m denotes an integer falling within a range of 1 to 8 and n denotes an integer falling within a range of 1 to 9, with m+n being from 3 to 10.

m desirably denotes an integer falling within a range of 1 to 5, preferably an integer falling within a range of 1 to 4, and more preferably, an integer falling within a range of 1 to 3.

n desirable denotes an integer falling within a range of 2 to 9, preferably an integer of 2 to 8, more preferably an integer of 2 to 7, and still more preferably, an integer falling within a range of 3 to 6.

<Method of Synthesizing Component (A)>

The method of synthesizing component (A) is not specifically limited. For example, a known synthesis example such as the method described in Japanese Unexamined Patent Publication (KOKAI) No. 2007-277514, paragraph 0114, can be used to synthesize component (A). One example is the method of reacting in an addition reaction or the like a thiol compound of valence (m+n) and a compound having a functional group reacting with the thiol compound. The compound reacting with the thiol compound is desirably a compound having a reactive group such as an acid halide, an alkyl halide, an isocyanate, or a carbon-carbon double bond. A carbon-carbon double bond is preferred, and a vinyl group is of greater preference. Incorporating the partial structure denoted by "$A^1$-$R^2$—" by reacting a compound denoted by "$A^1$-$R^2$—Z" (where Z denotes the reactive group) with the n thiol groups of a multifunctional thiol compound having (m+n) thiol groups, and reacting m thiol groups with the compound denoted by "$P^1$—Z" (where Z denotes the reactive group) to incorporate "$P^1$—", it is possible to obtain the compound denoted by formula (1).

Among compounds having the vinyl group, examples of those having the carboxyl group are: (meth)acrylic acid, carboxyethyl(meth)acrylic acid, crotonic acid, itaconic acid, maleic acid, fumaric acid, citraconic acid, p-vinyl benzoate, m-vinyl benzoate, o-vinyl benzoate, other unsaturated carboxylic acid monomers, 2-methacryloyl oxymethyl succinate, 1-heptenic acid, 1-hexenic acid, 1-pentenic acid, and 1-butenoic acid.

Examples of compounds having the sulfonic acid group are: p-styrene sulfonate, 2-acrylamido-2-methylpropane sulfonate, 3-sulfopropyl(meth)acrylic acid ester, and bis(3-sulfopropyl)itaconic acid ester.

Examples of compounds having the phosphoric acid group are: vinyl phosphonate, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate. Among compounds having the vinyl group, examples of compounds having the tertiary amino group are: N,N-dimethylaminoethyl(meth)acrylate, N,N-dimethylaminopropyl (meth)acrylate, N,N-diethylaminoethyl(meth)acrylate, N,N-diethylaminopropyl(meth)acrylate, N,N-dimethylaminoethyl(meth) acrylamide, N,N-dimethylaminopropyl(meth)acrylamide, N,N-diethylaminoethyl(meth)acrylamide, N,N-diethylaminopropyl(meth)acrylamide, vinyl pyrrolidone, 2-vinyl pyridine, 4-vinyl pyridine, 2-methyl-6-vinyl pyridine, and 5-ethyl-2-vinyl pyridine.

An example of a compound having the secondary amino group is 2-(t-butylaminoethyl)(meth)acrylate.

Examples of compounds having the ammonium salt are: quaternized N,N-dimethylaminoethyl(meth)acrylate, quaternized N,N-diethylaminoethyl(meth)acrylate, and quaternized N,N-dimethylaminopropyl(meth)acrylate.

Among compounds having the vinyl group, examples of compounds having the hydroxyl group are: 3-buten-1-ol, 4-penten-2-ol, 3-methyl-3-buten-1-ol, 4-penten-1-ol, glycerine mono(meth)acrylate, 2-hydroxyethyl(meth)acrylate, hydroxypropyl(meth)acrylate, and polyethylene glycol mono(meth)acrylate.

Examples of the multifunctional thiol employed that is suited to the above synthesis reaction are: pentaerythritoltetrakis(3-mercaptopropionate); dipentaerythritol hexa-3-mercaptopropionate; and Karenz MT-NR1, Karenz MT-PE1, TPMB, and TEMB made by Showa Denko (K.K.).

The reaction is conducted for example at a reaction temperature of about 50° C. to 200° C., normally in the presence of reaction solvent. Examples of the reaction solvent that can be employed are those described in Japanese Unexamined Patent Publication (KOKAI) No. 2007-277514, paragraphs 0134 and 0139; propylene glycol monomethyl ether; tetrahydrofuran, methyl ethyl ketone, ethyl acetate, toluene, butyl acetate, N-methyl pyrrolidone, dimethyl formamide, dimethyl acetamide, and other general-purpose organic solvents. In the case where the reaction is a radical polymerization reaction, the radical generator described in Japanese Unexamined Patent Publication (KOKAI) No. 2007-277514, paragraph 0135; the radical polymerization initiator described in the same publication, paragraph 0140; and other known radical generators and radical polymerization initiators can be employed. The blending ratio of the reaction starting materials such as monomers and multifunctional thiols can be suitably determined based on the structure and molecular weight of the compound denoted by formula (1) that is desired, the solubility of the reaction starting materials, and the like.

Following the synthesis reaction, post-processing such as purification can be conducted by known methods as needed, to obtain the targeted compound.

Employing above-described component (A) as a compound of the magnetic coating composition for a magnetic recording medium makes it possible to increase the dispersibility and dispersion stability of the ferromagnetic powder (component (C)) that can function as a dispersing agent. The content of component (A) in the composition is desirably 2 weight parts to 30 weight parts per 100 weight parts of component (C) from the perspective of achieving both a good fill rate and dispersibility of the ferromagnetic powder in the magnetic layer that is formed.

Component (B)

Various resins that are commonly employed as binder in particulate magnetic recording media can be employed without any limitation as the binder that is component (B). For example, polyurethane resin, polyester resin, polyamide resin, vinyl chloride resin, acrylic resin obtained by copolymerizing styrene, acryonitrile, methyl methacrylate, and the like; cellulose resin such as nitrocellulose, epoxy resin, phenoxy resin, polyvinyl acetal, polyvinyl butyral, and other polyvinyl alkylal resin can be employed singly or as mixtures of two or more thereof. Of these, polyurethane resin, acrylic resin, cellulose resin, and vinyl chloride resin are desirable. Polyurethane resin and vinyl chloride resin are preferred. These resins can also be employed as binders in the nonmagnetic layer, described further below. Reference can be made to Japanese Unexamined Patent Publication (KOKAI) No. 2010-24113, which is expressly incorporated herein by reference in its entirety, paragraphs 0028 to 0031, with regard to these binders. The binder content in the composition, for example, falls within a range of 5 weight percent to 50 weight percent, desirably within a range of 10 weight percent to 30 weight percent, of the ferromagnetic powder. A curing agent can be employed along with the resin. When component (A) comprises a functional group capable of undergoing a crosslinking reaction with the curing agent, the use of the curing agent can enhance the coating strength, thereby enhancing the running durability of the magnetic recording medium. Details regarding the curing agent will be set forth further below.

Component (C)

Component (C) is ferromagnetic powder. In the composition of an aspect of the present invention, the dispersibility and dispersion stability of the ferromagnetic powder (component (C)) can be enhanced by component (A). Accordingly, the use of the composition can permit the obtaining of a magnetic recording medium affording good electromagnetic characteristics by having a magnetic layer in which ferromagnetic powder is dispersed well.

The average particle size of the ferromagnetic powder is desirably equal to or less than 50 nm. Ferromagnetic powder with an average particle size of equal to or less than 50 nm is ferromagnetic powder that can achieve the high density recording that has been demanded in recent years. However, increased dispersibility of such ferromagnetic powder may be difficult to achieve. In contrast, according to an aspect of the present invention, increased dispersibility of the ferromagnetic powder with the above size can be achieved by means of component (A). From the perspective of magnetization stability, the average particle size is desirably equal to or more than 10 nm.

The average particle size of the ferromagnetic powder is a value that is measured by the following method with a transmission electron microscope.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention, the average particle size of the powder is the average particle size as obtained by the above method. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention, the size of the particles constituting powder such as ferromagnetic powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

Hexagonal ferrite powder is a specific example of desirable ferromagnetic powder. From the perspectives of achieving higher density recording and magnetization stability, the average particle size (average plate diameter) of hexagonal ferrite powder desirably ranges from 10 nm to 50 nm, preferably 20 nm to 50 nm. Reference can be made to Japanese Unexamined Patent Publication (KOKAI) No. 2011-216149, paragraphs 0134 to 0136, for details on hexagonal ferrite powder.

Ferromagnetic metal powder is also a specific example of desirable ferromagnetic powder. From the perspectives of achieving higher density recording and magnetization stability, the average particle size (average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, for details on ferromagnetic metal powder.

Component (D)

The composition according to an aspect of the present invention contains component (D) in addition to components (A) to (C) set forth above. Examples of the solvent are organic solvents that are generally employed to manufacture particulate magnetic recording media. Specific examples are: acetone, methyl ethyl ketone, methyl isobutyl ketone, diisobutyl ketone, cyclohexanone, isophorone, tetrahydrofuran, and other ketones; methanol, ethanol, propanol, butanol, isobutyl alcohol, isopropyl alcohol, methylcyclohexanol, and other alcohols; methyl acetate, butyl acetate, isobutyl acetate, isopropyl acetate, ethyl lactate, glycol acetate, and other esters; glycol dimethyl ether, glycol monoethyl ether, dioxane, and other glycol ethers; benzene, toluene, xylene, cresol, clorobenzene, and other aromatic hydrocarbons; methylene chloride, ethylene chloride, carbon tetrachloride, chloroform, ethylene chlorohydrin, dichlorobenzene, and other chlorinated hydrocarbons; N,N-dimethylformamide; and hexane. They can be employed in any ratio. Of these, the use of organic solvents containing ketones (ketone based organic solvent) is desirable from the perspectives of the solubility of the binders that are commonly employed in magnetic recording media and adsorption of the binder to the surface of the particles of ferromagnetic powder.

The above organic solvent does not have to be 100 percent pure, and may contain impurities, such as foreign matter, unreacted material, byproducts, decomposition products, oxides, and moisture, in addition to the primary component. These impurities desirably constitute equal to or less than 30 weight percent, preferably equal to or less than 10 weight percent. Somewhat strong polarity is desirable for enhancing dispersion; it is desirable for the solvent composition to comprise equal to or greater than 50 weight percent of a solvent with a dielectric constant of equal to or greater than 15. A dissolution parameter of 8 to 11 is desirable. The quantity of solvent in the magnetic coating composition for a magnetic recording medium of an aspect of the present invention is not specifically limited, and can be set to the range as in a common coating liquid for forming a magnetic layer in a particulate magnetic recording medium.

Other Components

In addition to components (A) to (D) set forth above, additives can be added as needed to the magnetic coating composition for a magnetic recording medium of an aspect of the present invention. Examples of the additives are abrasives, lubricants, dispersing agents, dispersing adjuvants, anti fungal agents, antistatic agents, oxidation-inhibiting agents, carbon black, and other of the various additives that are commonly employed to form particulate magnetic recording media. The additives can be used by suitably selecting commercial products based on the properties that are desired. In the composition of an aspect of the present invention, component (A) can functions as a dispersing agent.

As stated above, the composition of an aspect of the present invention can contain a curing agent. From the perspective of the crosslinking reaction property and the like, polyisocyanate is desirable as the curing agent. Reference can be made to Japanese Unexamined Patent Publication (KOKAI) No. 2011-216149, paragraph 0124 and 0125 for details on polyisocyanates. From the perspective of enhancing the coating strength, the curing agent is desirably employed by adding a quantity of 0 weight part to 80 weight parts, for example, and desirably 50 weight parts to 80 weight parts, per 100 weight parts of binder to the coating liquid for forming the magnetic layer.

Above-described component (A) contained in the magnetic coating composition for a magnetic recording medium of an aspect of the present invention contains a moiety $P^1$ that can function as a steric repulsion group in the dispersion medium (solvent) and a moiety $A^1$ that can function as a moiety that can adsorb to the surface of particles of ferromagnetic powder, thereby preventing the aggregation in solvent of ferromagnetic particles, particularly particles with small particle size, of ferromagnetic powder. Accordingly, the composition can be used as is, or after adding solvent and known additives, as a coating liquid for forming a magnetic layer to obtain a magnetic recording medium affording good electromagnetic characteristics because the particles with small particle size of ferromagnetic powder are dispersed well. Additionally, the composition can exhibit good dispersion stability and maintain a state of high dispersion even following storage for extended periods. Accordingly, without having to prepare a coating liquid each time one fabricates a magnetic recording medium, one can prepare a large amount of magnetic layer-forming coating liquid and store it for use as needed. The composition can be used in a good dispersed state even following storage for extended periods. This can contribute to enhancing productivity. The magnetic recording medium having a magnetic layer that is formed with the composition of an aspect of the present invention can also afford good running durability.

[Magnetic Recording Medium]

The magnetic recording medium of an aspect of the present invention has a magnetic layer, formed of the composition of an aspect of the present invention, on a nonmagnetic support. The magnetic layer in the magnetic recording medium is formed of the composition set forth above. As a result, it can contain ferromagnetic powder in a good dispersed state. Thus, the magnetic recording medium can afford good electromagnetic characteristics. A magnetic recording medium having a magnetic layer formed of the composition containing a curing agent and component (A) having a functional group capable of undergoing a cross-linking reaction with the curing agent can also exhibit good running durability.

The magnetic recording medium will be described in greater detail below.

Magnetic Layer

The magnetic layer is formed by coating and drying the above composition directly on the surface of a nonmagnetic support, or on the surface of another layer such as a nonmagnetic layer provided on the nonmagnetic support, and conducting a heat treatment or the like as needed. The composition that is employed to form the magnetic layer is as set forth above.

Nonmagnetic Layer

Details of the nonmagnetic layer will be described next. In the magnetic recording medium, a nonmagnetic layer containing nonmagnetic powder and binder can be formed between the nonmagnetic support and the magnetic layer. Either inorganic substances or organic substances can be employed as the nonmagnetic powder in the nonmagnetic layer. Carbon black can also be employed. Examples of inorganic substances are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details in this regard.

The binders, lubricants, dispersing agents, and other additives, solvents, dispersion methods, and the like of the magnetic layer can be applied to the nonmagnetic layer. In particular, techniques that are known with regard to the magnetic layer can be applied to the quantity and type of binder and the quantities and types of additives and dispersing agents that are added. It is also possible to add carbon black and organic powders to the nonmagnetic layer. In that regard, reference can be made to Japanese Unexamined Patent Publication (KOKAI) No. 2010-24113, paragraphs 0040 to 0042, for example.

Nonmagnetic Support

The above composition can be coated directly on the surface of a nonmagnetic support, or on the surface of another layer such as a nonmagnetic layer provided on the nonmagnetic support. Thereby, a magnetic recording medium having a magnetic layer on a nonmagnetic support, as needed, through another layer such as a nonmagnetic layer, can be obtained.

Examples of nonmagnetic supports are known supports such as biaxially stretched polyethylene terephthalate, polyethylene naphthalate, polyamide, polyamide-imide, and aromatic polyamide. Of these, polyethylene terephthalate, polyethylene naphthalate, and polyamide are desirable.

These supports can be subjected to corona discharge, plasma treatment, adhesion-enhancing treatment, and heat treatment in advance. The surface roughness of a nonmagnetic support that can be employed is desirably a center average roughness Ra of 3 nm to 10 nm at a cutoff value of 0.25 mm.

Layer Structure

With regard to the thickness of the nonmagnetic support and each layer in the magnetic recording medium, the thickness of the nonmagnetic support is desirably 3 µm to 80 µm. The thickness of the magnetic layer can be optimized for the magnetization saturation and head gap length of the magnetic head employed, the bandwidth of the recording signal, and the like, and is generally 10 nm to 150 nm, desirably 20 nm to 120 nm, preferably 30 nm to 100 nm. It suffices for the magnetic layer to be comprised of at least one layer, and it can be separated into two or more layers of differing magnetic characteristics. A structure relating to a known multilayer magnetic layer can be applied.

The thickness of the nonmagnetic layer is, for example, 0.1 µm to 3.0 µm, desirably 0.1 µm to 2.0 µm, and preferably 0.1 µm to 1.5 µm. The nonmagnetic layer in the present invention includes an essentially nonmagnetic layer containing trace quantities of ferromagnetic powder, for example, either as impurities or intentionally, in addition to the nonmagnetic powder. The essentially nonmagnetic layer means a layer exhibiting a residual magnetic flux density of equal to or less than 10 mT, a coercive force of equal to or less than 7.96 kA/m (100 Oe), or a residual magnetic flux density of equal to or less than 10 mT and a coercive force of equal to or less than 7.96 kA/m (100 Oe). The nonmagnetic desirably has no residual magnetic flux density or coercive force.

Backcoat Layer

In the magnetic recording medium of an aspect of the present invention, a backcoat layer can be provided on the opposite surface of the nonmagnetic support from the surface on which the magnetic layer is present. The backcoat layer desirably contains carbon black and inorganic powder. The formula of the magnetic layer or nonmagnetic layer can be applied to the binder and various additives for forming the backcoat layer. The backcoat layer is desirably equal to or less than 0.9 µm, preferably 0.1 to 0.7 µm in thickness.

Manufacturing Process

The process of manufacturing coating liquids for forming the magnetic layer, nonmagnetic layer, and backcoat layer normally comprises at least a kneading step, dispersing step, and a mixing step, provided as needed before and/or after these steps. Each of these steps can be divided into two or more stages. All of the starting materials employed in an aspect of the present invention, such as the ferromagnetic powder, nonmagnetic powder, binder, carbon black, abrasives, antistatic agents, lubricants, and solvents can be added either at the start of, or part way through, any step. Any of the starting materials can be divided up and added in two or more steps. For example, polyurethane can be divided up and added in the kneading step, dispersing step, and in a kneading step after the dispersing step for viscosity adjustment. To manufacture the magnetic recording medium of an aspect of the present invention, conventionally known manufacturing techniques can be employed. An apparatus with powerful kneading strength such as an open kneader, continuous kneader, pressure kneader, extruder, or the like is desirably employed in the kneading step. These kneading treatments are described in Japanese Unexamined Patent Publication (KOKAI) Heisei Nos. 1-106338 and 1-79274, which are expressly incorporated herein by reference in their entirety. Glass beads or some other beads can be employed to disperse the magnetic layer coating liquid, nonmagnetic layer coating liquid, or backcoat layer coating liquid. Dispersion beads of high specific gravity in the form of zirconia beads, titanium beads, or steel balls are suitable as such dispersion beads. These dispersion beads can be employed by optimizing their particle diameters and fill rates. A known dispersing apparatus can be employed. Reference can be made to Japanese Unexamined Patent Publication (KOKAI) No. 2010-24113, paragraphs 0051 to 0057, for details on methods of manufacturing the magnetic recording medium. The crosslinking reaction of the curing agent can proceed in the heating during the drying step and the calendering treatment. As needed, a separate heat treatment can also be conducted from the drying step and calendering treatment, as described in Japanese Unexamined Patent Publication (KOKAI) No. 2012-74097, which is expressly incorporated herein by reference in its entirety, paragraph 0055.

A magnetic layer in which particles with small particle size of ferromagnetic powder are dispersed well can be formed according to an aspect of the present invention. Thus, the present invention can provide a magnetic recording medium for high-density recording that affords good electromagnetic characteristics. An aspect of the present invention can also provide a magnetic coating composition for a magnetic recording medium comprising ferromagnetic powder with good dispersion stability that remains in a good dispersed state over extended periods. The magnetic recording medium according to the further aspect can exhibit a high degree of running durability.

EXAMPLES

The present invention will be described in detail below based on Examples. However, the present invention is not limited to embodiments shown in Examples. The terms "parts" and "percent" given in Examples are weight parts and weight percent unless otherwise stated.

The acid numbers and basic numbers set forth below were determined by the above-described method.

The weight average molecular weights given below were obtained by measurement by the GPC method as polystyrene-converted values.

1. Synthesis Examples of Component (A) and Comparative Compound

<Synthesis of Compound A-1>

To a 300 mL three-necked flask with cooling tube, nitrogen introduction pipe, and stirrer were charged 23.0 g (29.4 mmol) of dipentaerythritolhexakis(3-mercaptopropionate) (DPMP, made by Sakai Chemical Industries Co., Ltd.), 2.12 g (29.4 mmol) of methacrylic acid, and 100.5 g of propylene glycol monomethyl ether and the mixture was heated to 90° C. To this was added 0.17 g of dimethyl 2,2'-azobisisobutyrate (V-601, made by Wako Pure Chemical Industries, Ltd.) and the mixture was stirred for 2 hours. A 0.05 g quantity of dimethyl 2,2'-azobisisobutyrate was then added and the mixture was stirred for 4 hours.

Next, 44.2 g (441 mmol) of methyl methacrylate and 0.02 g of dimethyl 2,2'-azobisisobutyrate were added, the mixture was stirred for 2 hours, 0.01 g of dimethyl 2,2'-azobisisobutyrate was added, and the mixture was stirred for 4 hours.

<Synthesis of Compounds A-2 to A-32 and Comparative Compound a-33>

With the exception that the reagents shown in Table 1 were employed, synthesis was conducted by the same method as in A-1.

<Synthesis of Comparative Compound a-34>

To a 300 mL three-necked flask with cooling tube, nitrogen introduction pipe, and stirrer were charged 23.0 g (29.4 mmol) of DPMP, 176.6 g (1,764 mmol) of methacrylic acid, and 300 g of propylene glycol monomethyl ether and the mixture was heated to 90° C. To this was added 0.6 g of dimethyl 2,2'-azobisisobutyrate and the mixture was stirred for 2 hours. A 0.2 g quantity of dimethyl 2,2'-azobisisobutyrate was then added and the mixture was stirred for 4 hours.

<Synthesis of Comparative Compound a-35>

Example Compound P-6 in Japanese Unexamined Patent Publication (KOKAI) No. 2011-216149 was synthesized by the method described in that publication.

Table 1 below gives the details, the acid numbers (for compounds in which $A^1$ is in the form of an acidic group), the base numbers (for compounds in which $A^1$ is in the form of a basic group), and the weight average molecular weights of the structures of the above Compounds and Comparative Compounds.

TABLE 1

| | Monomer for introduction of $P^1$ | | | Composition of monomer (weight percent) | | | Starting material denoted by $A^1$-$R^2$-Z |
|---|---|---|---|---|---|---|---|
| | Monomer 1 | Monomer 2 | Monomer 3 | Monomer 1 | Monomer 2 | Monomer 3 | |
| A-1 | Methyl methacrylate | 2-hydroxyethyl methacrylate | — | 98.5 | 1.5 | — | Methacrylic acid |
| A-2 | Methyl methacrylate | 2-hydroxyethyl methacrylate | — | 98.5 | 1.5 | — | Itaconic acid |
| A-3 | Methyl methacrylate | 2-hydroxyethyl methacrylate | — | 98.5 | 1.5 | — | 2-carboxyethyl methacrylic acid |
| A-4 | Methyl methacrylate | 2-hydroxyethyl methacrylate | Styrene | 78.5 | 1.5 | 20 | Itaconic acid |
| A-5 | Methyl methacrylate | 2-hydroxyethyl methacrylate | Benzyl methacrylate | 18.5 | 1.5 | 80 | Itaconic acid |
| A-6 | Methyl methacrylate | 2-hydroxyethyl methacrylate | — | 98.5 | 0.1 | — | Itaconic acid |
| A-7 | Methyl methacrylate | 3-hydroxyethyl methacrylate | — | 75 | 25 | — | Itaconic acid |
| A-8 | Methyl methacrylate | Polyethylene glycol monomethacrylate (Blemmer PE-350 made by NOF Corp.) | — | 98.5 | 1.5 | — | Itaconic acid |
| A-9 | Methyl methacrylate | 2-(t-butylamino) ethyl methacrylate | — | 98.5 | 1.5 | — | Itaconic acid |
| A-10 | 2-ethylhexyl methacrylate | 2-hydroxyethyl methacrylate | — | 98.5 | 1.5 | — | Itaconic acid |
| A-11 | 2-ethylhexyl acrylate | 2-hydroxyethyl methacrylate | — | 98.5 | 1.5 | — | Itaconic acid |
| A-12 | Methyl methacrylate | 2-hydroxyethyl methacrylate | — | 98.5 | 1.5 | — | Itaconic acid |
| A-13 | Methyl methacrylate | 2-hydroxyethyl methacrylate | — | 98.5 | 1.5 | — | Itaconic acid |
| A-14 | Methyl methacrylate | 2-hydroxyethyl methacrylate | — | 98.5 | 1.5 | — | Itaconic acid |
| A-15 | Methyl methacrylate | 2-hydroxyethyl methacrylate | — | 98.5 | 1.5 | — | Itaconic acid |

TABLE 1-continued

| | | | | | | | |
|---|---|---|---|---|---|---|---|
| A-16 | Methyl methacrylate | 2-hydroxyethyl methacrylate | — | 98.5 | 1.5 | — | Methacrylic acid |
| A-17 | Methyl methacrylate | 2-hydroxyethyl methacrylate | — | 98.5 | 1.5 | — | Methacrylic acid |
| A-18 | Methyl methacrylate | 2-hydroxyethyl methacrylate | — | 98.5 | 1.5 | — | Itaconic acid |
| A-19 | Methyl methacrylate | 2-hydroxyethyl methacrylate | — | 98.5 | 1.5 | — | Itaconic acid |
| A-20 | Methyl methacrylate | 2-hydroxyethyl methacrylate | — | 98.5 | 1.5 | — | Itaconic acid |
| A-21 | Methyl methacrylate | 2-hydroxyethyl methacrylate | — | 98.5 | 1.5 | — | Methacrylic acid |
| A-22 | Methyl methacrylate | 2-hydroxyethyl methacrylate | — | 98.5 | 1.5 | — | Methacrylic acid |
| A-23 | Methyl methacrylate | 2-hydroxyethyl methacrylate | — | 98.5 | 1.5 | — | Itaconic acid |
| A-24 | Methyl methacrylate | 2-hydroxyethyl methacrylate | — | 98.5 | 1.5 | — | Itaconic acid |
| A-25 | Methyl methacrylate | 2-hydroxyethyl methacrylate | — | 98.5 | 1.5 | — | Itaconic acid |
| A-26 | Methyl methacrylate | 2-hydroxyethyl methacrylate | — | 98.5 | 1.5 | — | 2-dimethylaminoethyl methacrylate |
| A-27 | Methyl methacrylate | 2-hydroxyethyl methacrylate | — | 98.5 | 1.5 | — | p-styrene sulfonate |
| A-28 | Methyl methacrylate | 2-hydroxyethyl methacrylate | — | 98.5 | 1.5 | — | 2-(methacryloyloxy) ethyl phosphate |
| A-29 | Methyl methacrylate | 2-hydroxyethyl methacrylate | — | 98.5 | 1.5 | — | 2-(t-butylamino) ethyl methacrylate |
| A-30 | Methyl methacrylate | 2-hydroxyethyl methacrylate | — | 98.5 | 1.5 | — | 2-hydroxyethyl methacrylate |
| A-31 | Methyl methacrylate | 2-hydroxyethyl methacrylate | — | 98.5 | 1.5 | — | Glycerine monomethacrylate (Blemmer GLM made by NOF Corp.) |
| A-32 | Methyl methacrylate | — | — | 100 | — | — | Itaconic acid |
| a-33 | Methyl methacrylate | 2-hydroxyethyl methacrylate | | 98.5 | 1.5 | | Itaconic acid |
| a-34 | | | | | | | |
| a-35 | | | | | | | |

$(A^1\text{-}R^2\text{-}S)_n\text{-}R^1\text{-}(P^1)_m$

| | Multifunctional thiol for introduction of $R^1$ | m | $R^1$ | $R^2$ | $A^1$ | n | Acid number or base number mgKOH/g | Weight average molecular weight |
|---|---|---|---|---|---|---|---|---|
| A-1 | DPMP made by Sakai Chemical Industries | 5 | C-13 | T-4 | Carboxyl grorup | 1 | 28.5 | 2300 |
| A-2 | DPMP made by Sakai Chemical Industries | 5 | C-13 | T-13 | Carboxyl grorup | 1 | 56.0 | 2100 |
| A-3 | DPMP made by Sakai Chemical Industries | 5 | C-13 | T-5 | Carboxyl grorup | 1 | 25.0 | 2300 |
| A-4 | DPMP made by Sakai Chemical Industries | 5 | C-13 | T-13 | Carboxyl grorup | 1 | 62.3 | 1900 |
| A-5 | DPMP made by Sakai Chemical Industries | 5 | C-13 | T-13 | Carboxyl grorup | 1 | 28.1 | 4800 |
| A-6 | DPMP made by Sakai Chemical Industries | 5 | C-13 | T-13 | Carboxyl grorup | 1 | 99.9 | 1200 |
| A-7 | DPMP made by Sakai Chemical Industries | 5 | C-13 | T-13 | Carboxyl grorup | 1 | 30.5 | 3800 |
| A-8 | DPMP made by Sakai Chemical Industries | 5 | C-13 | T-13 | Carboxyl grorup | 1 | 46.7 | 2500 |
| A-9 | DPMP made by Sakai Chemical Industries | 5 | C-13 | T-13 | Carboxyl grorup | 1 | 28.1 | 4600 |
| A-10 | DPMP made by Sakai Chemical Industries | 5 | C-13 | T-13 | Carboxyl grorup | 1 | 46.5 | 2300 |
| A-11 | DPMP made by Sakai Chemical Industries | 5 | C-13 | T-13 | Carboxyl grorup | 1 | 33.3 | 3000 |
| A-12 | DPMP made by Sakai Chemical Industries | 3 | C-13 | T-13 | Carboxyl grorup | 3 | 72.9 | 4800 |
| A-13 | DPMP made by Sakai Chemical Industries | 1 | C-13 | T-13 | Carboxyl grorup | 5 | 58.8 | 9500 |
| A-14 | Karenz MT-PE1 made by Showa Denko (tetrafunctional) | 3 | C-9 | T-13 | Carboxyl grorup | 1 | 36.3 | 3300 |
| A-15 | Karenz MT-NR1 made by Showa Denko (trifunctional) | 2 | C-5 | T-13 | Carboxyl grorup | 1 | 51.3 | 2200 |
| A-16 | Karenz MT-NR1 made by Showa Denko (trifunctional) | 1 | C-5 | T-4 | Carboxyl grorup | 2 | 105.3 | 1100 |
| A-17 | Karenz MT-NR1 made by Showa Denko (trifunctional) | 1 | C-5 | T-4 | Carboxyl grorup | 2 | 147.9 | 800 |
| A-18 | DPMP made by Sakai Chemical Industries | 1 | C-13 | T-13 | Carboxyl grorup | 5 | 48.5 | 12600 |
| A-19 | DPMP made by Sakai Chemical Industries | 1 | C-13 | T-13 | Carboxyl grorup | 5 | 30.8 | 18800 |
| A-20 | DPMP made by Sakai Chemical Industries | 5 | C-13 | T-13 | Carboxyl grorup | 1 | 10.4 | 9600 |
| A-21 | DPMP made by Sakai Chemical Industries | 5 | C-13 | T-4 | Carboxyl grorup | 1 | 5.9 | 9500 |

TABLE 1-continued

| ID | Source | | C- | T- | Functional group | | | |
|---|---|---|---|---|---|---|---|---|
| A-22 | DPMP made by Sakai Chemical Industries | 5 | C-13 | T-4 | Carboxyl grorup | 1 | 5.5 | 9800 |
| A-23 | DPMP made by Sakai Chemical Industries | 1 | C-13 | T-13 | Carboxyl grorup | 5 | 159.4 | 3500 |
| A-24 | DPMP made by Sakai Chemical Industries | 1 | C-13 | T-13 | Carboxyl grorup | 5 | 187.1 | 3000 |
| A-25 | DPMP made by Sakai Chemical Industries | 1 | C-13 | T-13 | Carboxyl grorup | 5 | 384.6 | 1500 |
| A-26 | DPMP made by Sakai ChemicalIndustries | 5 | C-13 | T-5 | Tertiary amino group | 1 | 48.1 | 1300 |
| A-27 | DPMP made by Sakai Chemical Industries | 5 | C-13 | T-9 | Sulfonic acid group | 1 | 37.3 | 3000 |
| A-28 | DPMP made by Sakai Chemical Industries | 5 | C-13 | T-5 | Phosphoric acid group | 1 | 43.1 | 2600 |
| A-29 | DPMP made by Sakai Chemical Industries | 5 | C-13 | T-5 | Secondary amino group | 1 | 18.1 | 3100 |
| A-30 | DPMP made by Sakai Chemical Industries | 5 | C-13 | T-5 | Hydroxyl group | 1 | — | 2500 |
| A-31 | DPMP made by Sakai Chemical Industries | 5 | C-13 | T-19 | Hydroxyl group | 1 | — | 1900 |
| A-32 | DPMP made by Sakai Chemical Industries | 5 | C-13 | T-13 | Carboxyl grorup | 1 | 22.0 | 5100 |
| a-33 | | 1 | C-13 | T-13 | Carboxyl grorup | 5 | 25.1 | 22300 |
| a-34 | | | | | | | | 3800 |
| a-35 | | | | | | | | 200000 |

DPMP made by Sakai Chemical Industries: dipentaerythritolhexakis(3-mercaptopropionate) Karenz MT-PE1 made by Showa Denko: pentaerythritoltetrakis(3-mercaptobutyrate) Karenz MT-NR1 made by Showa Denko: 1,3,5-tris(3-mercaptobutyryloxyethyl)-1,3,5-triazine-2,4,6(1H,3H,5H)-trion 2. Examples of Preparing the Magnetic Coating Composition for Magnetic Recording Media (Magnetic Layer Coating Liquid)

Example 1

Preparation of Magnetic Layer Coating Liquid Containing Ferromagnetic Hexagonal Ferrite Powder

| | |
|---|---|
| Tabular ferromagnetic hexagonal ferrite powder: | 100 parts |
| Composition excluding oxygen (molar ratio): | Ba/Fe/Co/Zn = 1/9/0.2/1 |
| Hc: | 160 kA/m (about 2,000 Oe) |
| Average particle size (average plate diameter): | 20 nm |
| Average plate ratio: | 2.7 |
| BET specific surface area: | 60 m$^2$/g |
| σs: | 46 A · m$^2$/kg (46 emu/g) |
| Compound A-1: | 10 parts |
| Polyurethane resin (Vylon UR4800, made by Toyobo Co.): | 4 parts |
| Vinyl chloride resin (MR104 made by Kaneka): | 10 parts |
| α-Al$_2$O$_3$ (average particle size: 0.1 μm): | 8 parts |
| Carbon black (average particle diameter: 20 nm): | 0.5 part |
| Cyclohexanone | 110 parts |

The various components above were kneaded in an open kneader and then dispersed in a sand mill. The components listed below were added to the dispersion obtained, the mixture was stirred, and ultrasonic processing was conducted. The product was filtered with a filter having an average pore diameter of 1 μm to prepare a magnetic layer coating liquid.

| | |
|---|---|
| Butyl stearate: | 1.5 parts |
| Stearic acid: | 0.5 part |
| Amide stearate: | 0.2 part |
| Methyl ethyl ketone: | 50 parts |
| Cyclohexanone: | 50 parts |
| Toluene: | 3 parts |
| Polyisocyanate compound (Coronate 3041, made by Nippon Polyurethane Industry Co., Ltd.): | 5 parts |

Examples 2 to 33, Comparative Examples 1 to 3

With the exception that Compound A-1 was replaced with the compounds (A) or Comparative Compounds shown in Table 2, magnetic layer coating liquids were prepared in the same manner as in Example 1.

Comparative Example 34

Preparation of Magnetic Layer Coating Liquid Containing Ferromagnetic Metal Powder

| | |
|---|---|
| Ferromagnetic metal powder: | 100 parts |
| Composition | Fe/Co = 100/25 |
| Hc: | 195 kA/m (about 2,450 Oe) |
| BET specific surface area: | 65 m$^2$/g |
| Surface treatment agent: | Al$_2$O$_3$, SiO$_2$, Y$_2$O$_3$ |
| Average particle size (average major axis length): | 45 nm |
| Acicular ratio: | 5 |
| σs: | 110 A · m$^2$/kg (about 110 emu/g) |
| Compound A-1: | 10 parts |
| Polyurethane resin (Vylon (registered trademark) UR4800, made by Toyobo Co., functional group: SO$_3$Na, functional group concentration: 70 eq/t): | 5 parts |
| Vinyl chloride resin (MR104 made by Kaneka): | 10 parts |
| Methyl ethyl ketone: | 150 parts |
| Cyclohexanone: | 150 parts |
| α-Al$_2$O$_3$ Mohs hardness: 9 (average particle size: 0.1 μm): | 15 parts |
| Carbon black (average particle size: 0.08 μm): | 0.5 part |

The various components above were kneaded in an open kneader and then dispersed in a sand mill. The components listed below were added to the dispersion obtained, the mixture was stirred, and ultrasonic processing was conducted. The product was filtered with a filter having an average pore diameter of 1 μm to prepare a magnetic layer coating liquid.

| | |
|---|---|
| Butyl stearate: | 1.5 parts |
| Stearic acid: | 0.5 part |
| Amide stearate: | 0.2 part |
| Methyl ethyl ketone: | 50 parts |
| Cyclohexanone: | 50 parts |
| Toluene: | 3 parts |
| Polyisocyanate compound (Coronate 3041, made by Nippon Polyurethane Industry Co., Ltd.): | 5 parts |

3. Preparation Example of Magnetic Recording Medium (Magnetic Tape)

(1) Preparation of Nonmagnetic Layer Coating Liquid

| | |
|---|---|
| Carbon black: | 100 parts |
| DBP oil absorption capacity: | 100 mL/100 g |
| pH: | 8 |
| BET specific surface area: | 250 m$^2$/g |
| Volatile content: | 1.5 percent |
| Polyurethane resin (Vylon UR4800, made by Toyobo Co., functional group: SO$_3$Na, functional group concentration: 70 eq/t): | 20 parts |
| Vinyl chloride resin (functional group: OSO$_3$K, functional group concentration: 70 eq/t): | 30 parts |
| Trioctylamine: | 4 parts |
| Cyclohexanone: | 140 parts |
| Methyl ethyl ketone: | 170 parts |
| Butyl stearate: | 2 parts |
| Stearic acid: | 2 parts |
| Amide stearate: | 0.1 part |

The various components above were kneaded in an open kneader and then dispersed in a sand mill. The components listed below were added to the dispersion obtained, the mixture was stirred, and ultrasonic processing was conducted. The product was filtered with a filter having an average pore diameter of 1 μm to prepare a coating liquid for an undercoating layer (nonmagnetic layer).

| | |
|---|---|
| Butyl stearate: | 1.5 parts |
| Stearic acid: | 1 part |
| Methyl ethyl ketone: | 50 parts |
| Cyclohexanone: | 50 parts |
| Toluene: | 3 parts |
| Polyisocyanate compound (Coronate 3041, made by Nippon Polyurethane Industry Co., Ltd.): | 5 parts |

(2) Preparation of Coating Liquid for Backcoat Layer

| | |
|---|---|
| Carbon black (average particle size: 40 nm): | 85 parts |
| Carbon black (average particle size: 100 nm): | 3 parts |
| Nitrocellulose: | 28 parts |
| Polyurethane resin: | 58 parts |
| Copper phthalocyanine dispersing agent: | 2.5 parts |
| Nipporan 2301 (made by Nippon Polyurethane Industry Co., Ltd.): | 0.5 part |
| Methyl isobutyl ketone: | 0.3 part |
| Methyl ethyl ketone: | 860 parts |
| Toluene: | 240 parts |

The above components were prekneaded in a roll mill and then dispersed in a sand mill. Four parts of polyester resin (Vylon 500 made by Toyobo Co.), 14 parts of polyisocyanate compound (Coronate 3041 made by Nippon Polyurethane Industry Co., Ltd.), and 5 parts of α-Al$_2$O$_3$ (made by Sumitomo Chemical Co.) were added and the mixture was stirred and filtered to prepare a backcoat layer coating liquid.

Simultaneous multilayer coating was conducted in which the above nonmagnetic layer coating liquid was applied in a quantity calculated to yield a thickness upon drying of 0.15 μm on a polyethylene naphthalate resin support that was 5 μm thick, had a magnetic layer coating surface centerline surface roughness of 0.001 μm, and had been corona treated in advance to render the base surface thereof hydrophilic, followed immediately thereafter by an application of the above magnetic layer coating liquid prepared in 2. above in a quantity calculated to yield a magnetic layer thickness upon drying of 100 nm. While the two layers were still wet, they were oriented and dried with a cobalt magnet having a magnetic force of 0.5 T (5,000 G) and a solenoid having a magnetic force of 0.4 T (4,000 G). On the opposite side from the base surface that had been corona treated in advance, the above back coat layer coating liquid was coated in a quantity calculated to yield a thickness upon drying of 0.5 μm. Subsequently, a treatment was conducted at a rate of 80 m/min and at a temperature of 100° C. with a seven-stage calender comprised of metal rolls and the product was slit to a ½ inch width to prepare the magnetic tape of Example 1-1.

[Evaluation Method]

<Dispersibility>

A 0.5 mL quantity of the magnetic layer coating liquid was collected and diluted 200-fold with a mixed solution of methyl ethyl ketone (MEK)/cyclohexanone=6/4 (volumetric ratio) to prepare a dispersion for evaluation. The transmittance of the dispersion at a wavelength of 450 nm was measured with a UV-3600 made by Shimadzu Corp. and evaluation was conducted on the evaluation scale given below. Since the transmittance of a liquid (supernatant) increases as ferromagnetic powder aggregates or precipitates in a solution of low dispersibility, a determination can be made that the lower the transmittance, the better the dispersion A: Transmittance 0 to 10.0%
B: Transmittance 10.1 to 20.0%
C: Transmittance 20.1 to 40.0%
D: Transmittance 40.1 to 70.0%
E: Transmittance 70.1 to 100%

<Dispersion Stability>

The above magnetic layer coating liquid was left standing at room temperature (25° C.) for 14 days. Subsequently, the dispersion was diluted in the same manner as in the dispersibility evaluation. The transmittance at a wavelength of 450 nm of the dispersion obtained was evaluated with the same measurement device and by the same evaluation scale as above.

<Average Surface Roughness of Tape>

A 40 μm×40 μm surface area of the magnetic layer surface was measured and the centerline average surface roughness (Ra) was measured in contact mode with an atomic force microscope (AFM: Nanoscope III made by Digital Instruments).

<Electromagnetic Characteristics: the SN (Signal-to-Noise) Ratio>

An LTO-Gen4 (Linear Tape-Open-Generation 4) drive was used to record signals at a recording track width of 11.5 μm, a reproduction track width of 5.3 μm, and linear densities of 172 kfci and 86 kfci. The recording and reproduction signals were frequency analyzed with a spectrum analyzer. The ratio of the carrier signal during recording of the 172 kfci signal to the integral noise of the full spectral band during recording of the 86 kfci signal was adopted as the SN ratio. An LTO-Gen4 tape made by FUJIFILM was employed as a reference tape. Adopting the SN ratio of the reference tape as 0 dB, the relative values of the SN ratios of the various tapes were determined.

<Running Durability (Amount of Grime on the Tape Surface)

A 100 m length of tape was passed once at an angle of 150 degrees so that it came in direct contact with the magnetic layer surface at the edge of a bar with a square cross section measuring 7 mm×7 mm made of $Al_2O_3$/TiC with a load of 100 g and at a rate of 6 m/s, the edge portion of the square bar was observed under a microscope, and the amount of grime adhering was evaluated. The evaluation was conducted organoleptically and evaluation was conducted on a 10-step scale, with 10 being the least grime and 1 being the most grime.

The grime evaluated by the above method was primarily caused by shaving of the surface of the magnetic layer. The lower the value of the evaluation result, the greater the shaving of the magnetic layer surface and the worse the running durability. An evaluation of equal to or higher than 8 was determined to indicate little grime (little shaving of the magnetic layer surface) and good running durability.

The results are given in Table 2 below.

TABLE 2

| | Composition of ferromagnetic powder dispersion (weight parts) | | | | | | | |
|---|---|---|---|---|---|---|---|---|
| | Type of dispersing agent | Ferromagnetic powder | Dispersing agent | Polyurethane | Vinyl chloride resin | α-$Al_2O_3$ | Carbon black | Cyclohexanone |
| Ex. 1 | A-1 | 100 | 10 | 4 | 10 | 8 | 0.5 | 110 |
| Ex. 2 | A-2 | 100 | 10 | 4 | 10 | 8 | 0.5 | 110 |
| Ex. 3 | A-3 | 100 | 10 | 4 | 10 | 8 | 0.5 | 110 |
| Ex. 4 | A-4 | 100 | 10 | 4 | 10 | 8 | 0.5 | 110 |
| Ex. 5 | A-5 | 100 | 10 | 4 | 10 | 8 | 0.5 | 110 |
| Ex. 6 | A-6 | 100 | 10 | 4 | 10 | 8 | 0.5 | 110 |
| Ex. 7 | A-7 | 100 | 10 | 4 | 10 | 8 | 0.5 | 110 |
| Ex. 8 | A-8 | 100 | 10 | 4 | 10 | 8 | 0.5 | 110 |
| Ex. 9 | A-9 | 100 | 10 | 4 | 10 | 8 | 0.5 | 110 |
| Ex. 10 | A-10 | 100 | 10 | 4 | 10 | 8 | 0.5 | 110 |
| Ex. 11 | A-11 | 100 | 10 | 4 | 10 | 8 | 0.5 | 110 |
| Ex. 12 | A-12 | 100 | 10 | 4 | 10 | 8 | 0.5 | 110 |
| Ex. 13 | A-13 | 100 | 10 | 4 | 10 | 8 | 0.5 | 110 |
| Ex. 14 | A-14 | 100 | 10 | 4 | 10 | 8 | 0.5 | 110 |
| Ex. 15 | A-15 | 100 | 10 | 4 | 10 | 8 | 0.5 | 110 |
| Ex. 16 | A-16 | 100 | 10 | 4 | 10 | 8 | 0.5 | 110 |
| Ex. 17 | A-17 | 100 | 10 | 4 | 10 | 8 | 0.5 | 110 |
| Ex. 18 | A-18 | 100 | 10 | 4 | 10 | 8 | 0.5 | 110 |
| Ex. 19 | A-19 | 100 | 10 | 4 | 10 | 8 | 0.5 | 110 |
| Ex. 20 | A-20 | 100 | 10 | 4 | 10 | 8 | 0.5 | 110 |
| Ex. 21 | A-21 | 100 | 10 | 4 | 10 | 8 | 0.5 | 110 |
| Ex. 22 | A-22 | 100 | 10 | 4 | 10 | 8 | 0.5 | 110 |
| Ex. 23 | A-23 | 100 | 10 | 4 | 10 | 8 | 0.5 | 110 |
| Ex. 24 | A-24 | 100 | 10 | 4 | 10 | 8 | 0.5 | 110 |
| Ex. 25 | A-25 | 100 | 10 | 4 | 10 | 8 | 0.5 | 110 |
| Ex. 26 | A-26 | 100 | 10 | 4 | 10 | 8 | 0.5 | 110 |
| Ex. 27 | A-27 | 100 | 10 | 4 | 10 | 8 | 0.5 | 110 |
| Ex. 28 | A-28 | 100 | 10 | 4 | 10 | 8 | 0.5 | 110 |
| Ex. 29 | A-29 | 100 | 10 | 4 | 10 | 8 | 0.5 | 110 |
| Ex. 30 | A-30 | 100 | 10 | 4 | 10 | 8 | 0.5 | 110 |
| Ex. 31 | A-31 | 100 | 10 | 4 | 10 | 8 | 0.5 | 110 |
| Ex. 32 | A-32 | 100 | 10 | 4 | 10 | 8 | 0.5 | 110 |
| Ex. 33 | A-2 | 100 | 10 | 4 | 10 | 8 | 0.5 | 110 |
| Ex. 34 | A-1 | 100 (Ferromagnetic metal powder) | 10 | 5 | 10 | 15 | 0.5 | 150 |
| Comp. Ex. 1 | a-33 | 100 | 10 | 4 | 10 | 8 | 0.5 | 110 |
| Comp. Ex. 2 | a-34 | 100 | 10 | 4 | 10 | 8 | 0.5 | 110 |
| Comp. Ex. 3 | a-35 | 100 | 10 | 4 | 10 | 8 | 0.5 | 110 |

| | Components mixed with ferromagnetic powder dispersion (weight parts) | | | | | | |
|---|---|---|---|---|---|---|---|
| | Butyl Stearate | Stearic acid | Amide Stearate | Methyl ethyl ketone | Cyclohexanone | Toluene | Polyisocyanate |
| Ex. 1 | 1.5 | 0.5 | 0.2 | 50 | 50 | 3 | 5 |
| Ex. 2 | 1.5 | 0.5 | 0.2 | 50 | 50 | 3 | 5 |
| Ex. 3 | 1.5 | 0.5 | 0.2 | 50 | 50 | 3 | 5 |
| Ex. 4 | 1.5 | 0.5 | 0.2 | 50 | 50 | 3 | 5 |
| Ex. 5 | 1.5 | 0.5 | 0.2 | 50 | 50 | 3 | 5 |
| Ex. 6 | 1.5 | 0.5 | 0.2 | 50 | 50 | 3 | 5 |
| Ex. 7 | 1.5 | 0.5 | 0.2 | 50 | 50 | 3 | 5 |
| Ex. 8 | 1.5 | 0.5 | 0.2 | 50 | 50 | 3 | 5 |
| Ex. 9 | 1.5 | 0.5 | 0.2 | 50 | 50 | 3 | 5 |
| Ex. 10 | 1.5 | 0.5 | 0.2 | 50 | 50 | 3 | 5 |
| Ex. 11 | 1.5 | 0.5 | 0.2 | 50 | 50 | 3 | 5 |

TABLE 2-continued

| | | | | | | | |
|---|---|---|---|---|---|---|---|
| Ex. 12 | 1.5 | 0.5 | 0.2 | 50 | 50 | 3 | 5 |
| Ex. 13 | 1.5 | 0.5 | 0.2 | 50 | 50 | 3 | 5 |
| Ex. 14 | 1.5 | 0.5 | 0.2 | 50 | 50 | 3 | 5 |
| Ex. 15 | 1.5 | 0.5 | 0.2 | 50 | 50 | 3 | 5 |
| Ex. 16 | 1.5 | 0.5 | 0.2 | 50 | 50 | 3 | 5 |
| Ex. 17 | 1.5 | 0.5 | 0.2 | 50 | 50 | 3 | 5 |
| Ex. 18 | 1.5 | 0.5 | 0.2 | 50 | 50 | 3 | 5 |
| Ex. 19 | 1.5 | 0.5 | 0.2 | 50 | 50 | 3 | 5 |
| Ex. 20 | 1.5 | 0.5 | 0.2 | 50 | 50 | 3 | 5 |
| Ex. 21 | 1.5 | 0.5 | 0.2 | 50 | 50 | 3 | 5 |
| Ex. 22 | 1.5 | 0.5 | 0.2 | 50 | 50 | 3 | 5 |
| Ex. 23 | 1.5 | 0.5 | 0.2 | 50 | 50 | 3 | 5 |
| Ex. 24 | 1.5 | 0.5 | 0.2 | 50 | 50 | 3 | 5 |
| Ex. 25 | 1.5 | 0.5 | 0.2 | 50 | 50 | 3 | 5 |
| Ex. 26 | 1.5 | 0.5 | 0.2 | 50 | 50 | 3 | 5 |
| Ex. 27 | 1.5 | 0.5 | 0.2 | 50 | 50 | 3 | 5 |
| Ex. 28 | 1.5 | 0.5 | 0.2 | 50 | 50 | 3 | 5 |
| Ex. 29 | 1.5 | 0.5 | 0.2 | 50 | 50 | 3 | 5 |
| Ex. 30 | 1.5 | 0.5 | 0.2 | 50 | 50 | 3 | 5 |
| Ex. 31 | 1.5 | 0.5 | 0.2 | 50 | 50 | 3 | 5 |
| Ex. 32 | 1.5 | 0.5 | 0.2 | 50 | 50 | 3 | 5 |
| Ex. 33 | 1.5 | 0.5 | 0.2 | 50 | 50 | 3 | 0 |
| Ex. 34 | 1.5 | 0.5 | 0.2 | 50 | 50 | 3 | 5 |
| Comp. Ex. 1 | 1.5 | 0.5 | 0.2 | 50 | 50 | 3 | 5 |
| Comp. Ex. 2 | 1.5 | 0.5 | 0.2 | 50 | 50 | 3 | 5 |
| Comp. Ex. 3 | 1.5 | 0.5 | 0.2 | 50 | 50 | 3 | 5 |

| | Dispersibility | Dispersion stability | SNR | Running durability Amount of grime 1(large)-10(little) |
|---|---|---|---|---|
| Ex. 1 | A | A | 2.0 | 10 |
| Ex. 2 | A | A | 2.0 | 10 |
| Ex. 3 | A | A | 2.0 | 10 |
| Ex. 4 | A | A | 1.5 | 10 |
| Ex. 5 | A | A | 1.5 | 10 |
| Ex. 6 | A | A | 2.0 | 9 |
| Ex. 7 | B | B | 1.5 | 10 |
| Ex. 8 | A | A | 1.5 | 10 |
| Ex. 9 | A | A | 1.5 | 10 |
| Ex. 10 | A | A | 2.0 | 9 |
| Ex. 11 | A | A | 2.0 | 9 |
| Ex. 12 | A | A | 1.5 | 10 |
| Ex. 13 | A | A | 1.5 | 10 |
| Ex. 14 | A | A | 2.0 | 10 |
| Ex. 15 | A | A | 1.0 | 10 |
| Ex. 16 | B | B | 1.0 | 8 |
| Ex. 17 | C | D | 0.5 | 7 |
| Ex. 18 | B | B | 1.5 | 9 |
| Ex. 19 | C | D | 1.0 | 9 |
| Ex. 20 | B | B | 1.0 | 9 |
| Ex. 21 | C | C | 1.0 | 8 |
| Ex. 22 | C | D | 1.0 | 7 |
| Ex. 23 | B | B | 1.5 | 8 |
| Ex. 24 | B | C | 1.0 | 7 |
| Ex. 25 | D | D | 1.0 | 6 |
| Ex. 26 | A | B | 2.0 | 10 |
| Ex. 27 | B | B | 1.5 | 8 |
| Ex. 28 | B | B | 1.5 | 9 |
| Ex. 29 | C | C | 1.0 | 6 |
| Ex. 30 | A | B | 2.0 | 9 |
| Ex. 31 | A | B | 2.0 | 9 |
| Ex. 32 | A | A | 1.0 | 6 |
| Ex. 33 | A | A | 1.0 | 6 |
| Ex. 34 | A | A | 1.0 | 10 |
| Comp. Ex. 1 | E | E | 1.0 | 1 |
| Comp. Ex. 2 | E | E | -0.5 | 1 |
| Comp. Ex. 3 | C | E | -1.0 | 2 |

Evaluation Results

As shown in Table 2, the magnetic coating compositions for a magnetic recording medium of Examples exhibited better results for both dispersibility and dispersion stability than the magnetic coating compositions of a magnetic recording medium of Comparative Examples. The magnetic tapes of Examples having magnetic layers formed of the magnetic coating composition for a magnetic recording medium exhibited both good electromagnetic characteristics and running durability.

In contrast, the tape of Comparative Example 1, in which a dispersing agent having a weight average molecular weight in excess of 20,000 was employed in the magnetic layer, exhibited poor running durability. The magnetic tapes of Comparative Examples 2 and 3 exhibited poorer results than Examples for both electromagnetic characteristics and running durability.

Based on the above results, it can be revealed that an aspect of the present invention can provide a magnetic recording medium with good electromagnetic characteristics and running durability, and a magnetic coating composition for a magnetic recording medium with good ferromagnetic powder dispersibility and dispersion stability.

The present invention is useful in the field of manufacturing magnetic recording media for high density recording, such as in high-capacity backup tapes.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic coating composition, which is a magnetic coating composition for a magnetic recording medium and comprises the following components (A) to (D):

(A) a compound denoted by formula (1) below having an acid number ranging from 10.4 to 224 mgKOH/g and a weight average molecular weight ranging from 1,000 to 15,000:

$$(A^1-R^2-S)n-R^1-(P^1)m \quad (1)$$

wherein, in formula (1), $R^1$ denotes an organic connecting group with a valence of (m+n); $R^2$ denotes a single bond or divalent organic connecting group; $A^1$ denotes an acidic group; m denotes an integer ranging from 1 to 8 and n denotes an integer ranging from 1 to 9, with m+n ranging from 3 to 10; each of n instances of $A^1$ and $R^2$ can be independently different or identical; $P^1$ denotes a polymer backbone; and m instances of $P^1$ can be identical or different;

(B) binder;
(C) ferromagnetic powder; and
(D) solvent, wherein the compound (A) is selected from the group consisting of the following compounds A-1, A-2, A-3, A-4, A-5, A-6, A-8, A-9, A-10, A-11, A-12, A-13, A-14, A-15, A-16, A-18, A-20, A-23, A-24, A-27, A-28 and A-32:

A-1 has the following structure with a weight average molecular weight of 2300 and an acid number of 28.5 mgKOH/g:

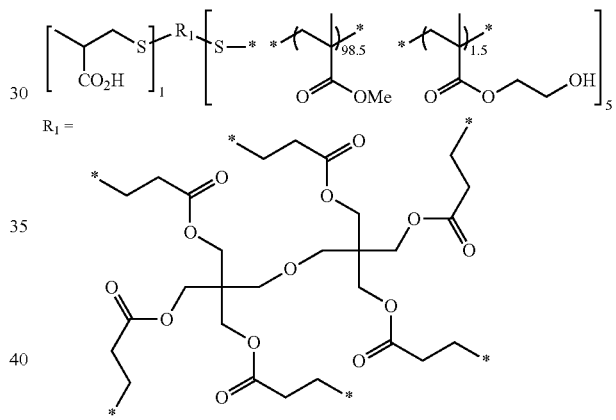

A-2 has the following structure with a weight average molecular weight of 2100 and an acid number of 56.0 mgKOH/g:

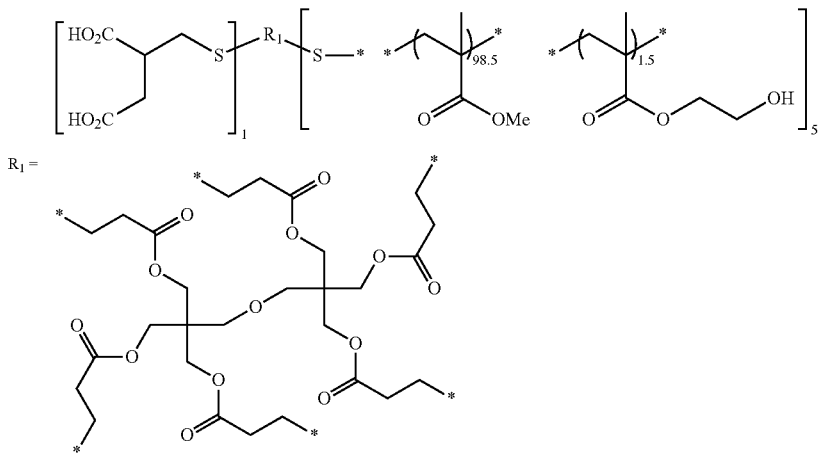

A-3 has the following structure with a weight average molecular weight of 2300 and an acid number of 25.0 mgKOH/g:

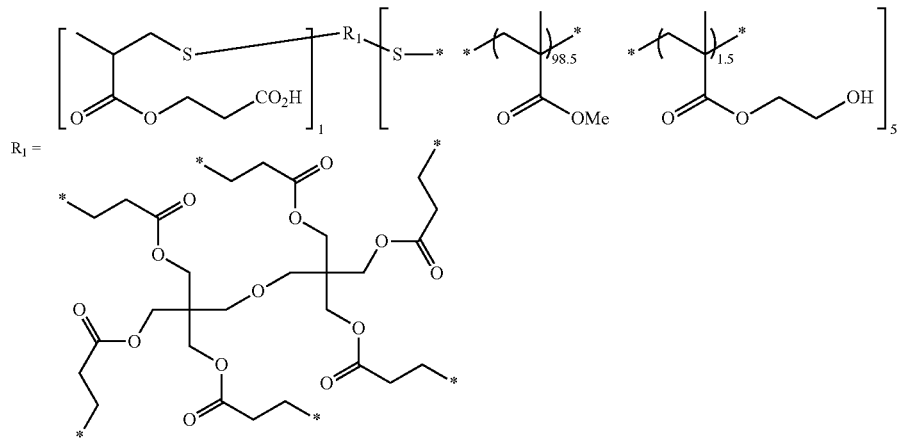

A-4 has the following structure with a weight average molecular weight of 1900 and an acid number of 62.3 mgKOH/g:

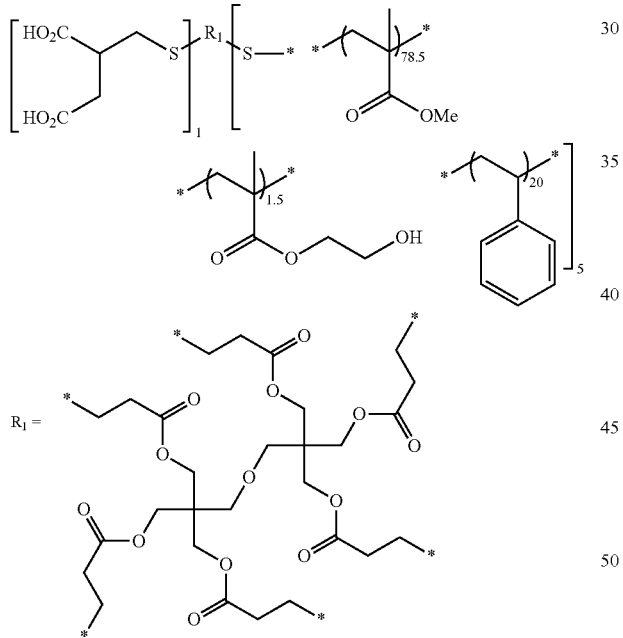

A-5 has the following structure with a weight average molecular weight of 4800 and an acid number of 28.1 mgKOH/g:

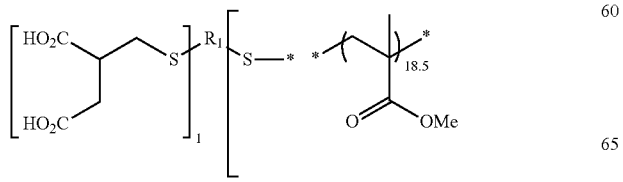

-continued

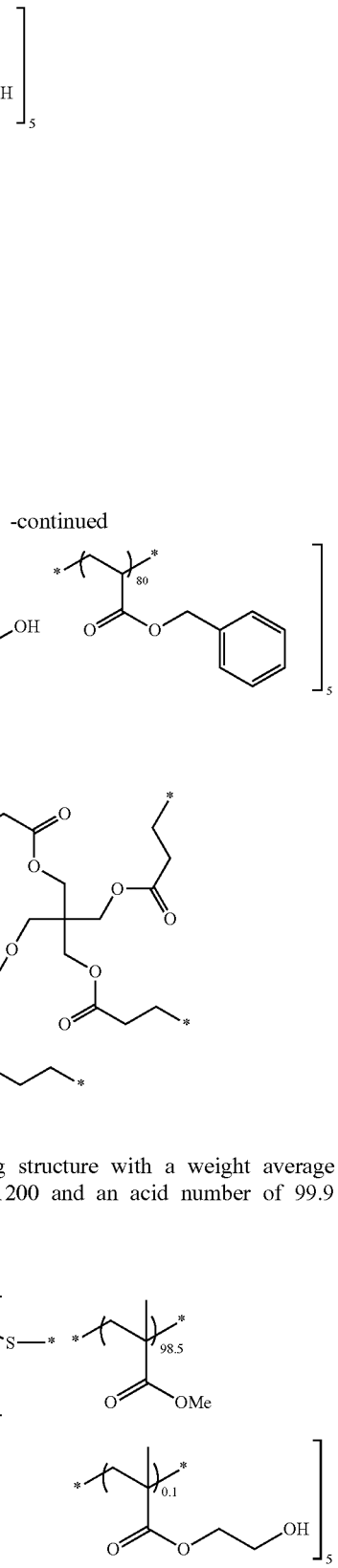

A-6 has the following structure with a weight average molecular weight of 1200 and an acid number of 99.9 mgKOH/g:

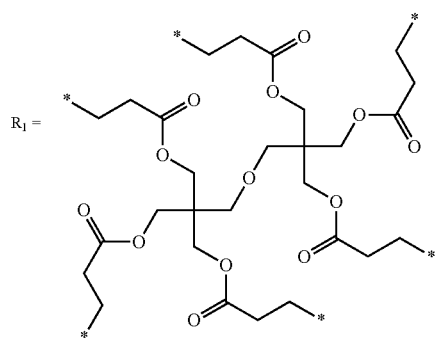

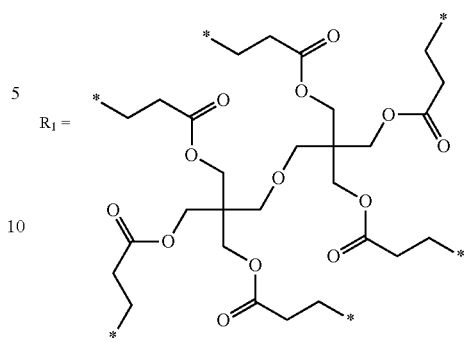

A-8 has the following structure with a weight average molecular weight of 2500 and an acid number of 46.7 mgKOH/g:

A-10 has the following structure with a weight average molecular weight of 2300 and an acid number of 46.5 mgKOH/g:

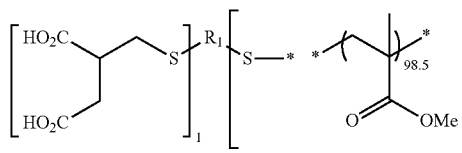

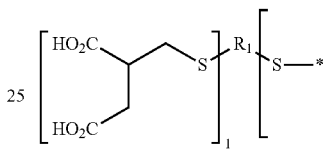

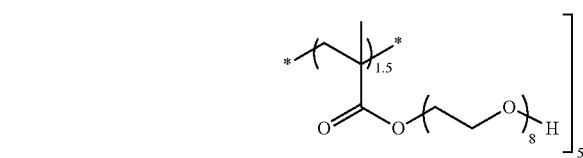

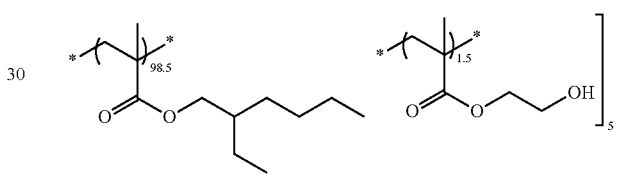

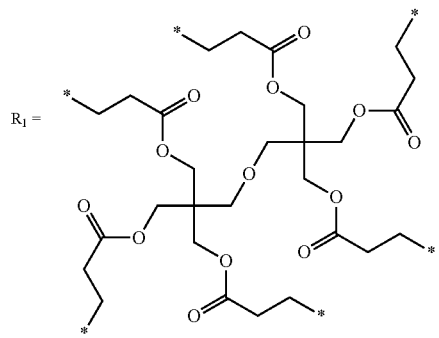

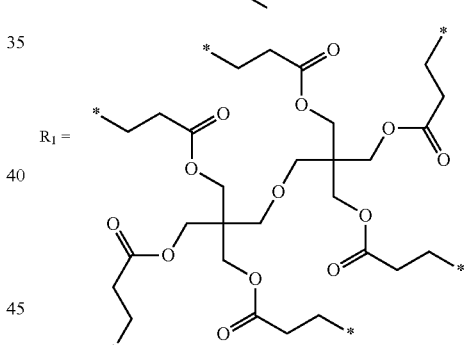

A-9 has the following structure with a weight average molecular weight of 4600 and an acid number of 28.1 mgKOH/g:

A-11 has the following structure with a weight average molecular weight of 3000 and an acid number of 33.3 mgKOH/g:

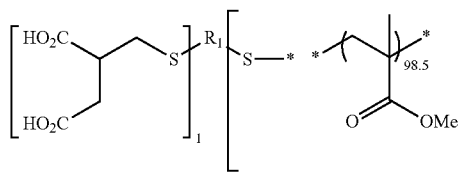

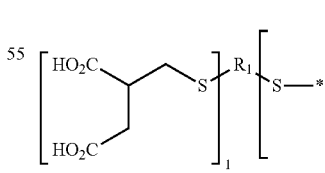

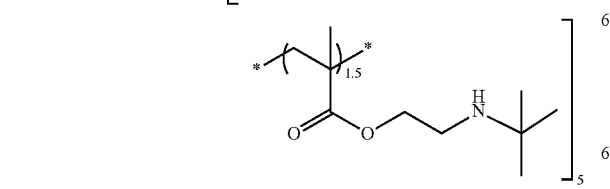

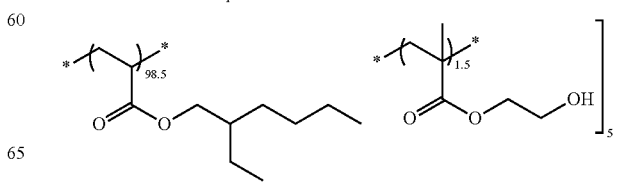

R₁ =

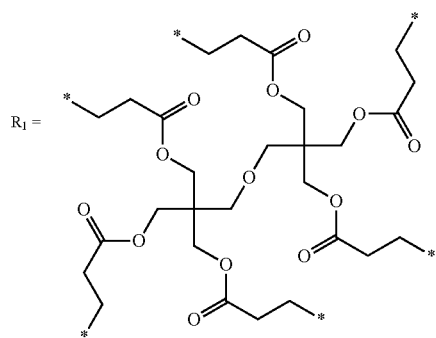

A-12 has the following structure with a weight average molecular weight of 4800 and an acid number of 72.9 mgKOH/g:

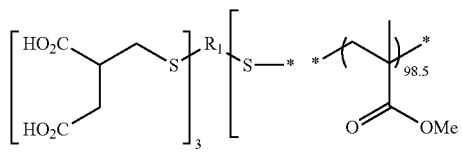

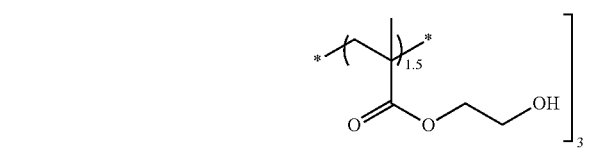

R₁ =

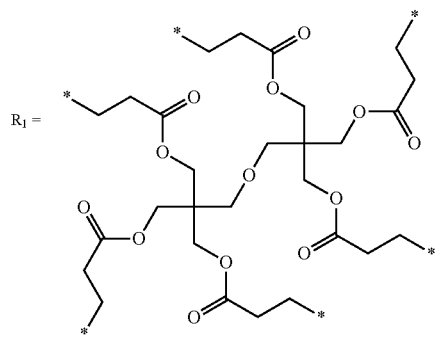

A-13 has the following structure with a weight average molecular weight of 9500 and an acid number of 58.8 mgKOH/g:

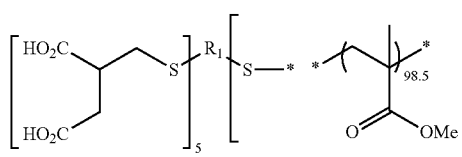

R₁ =

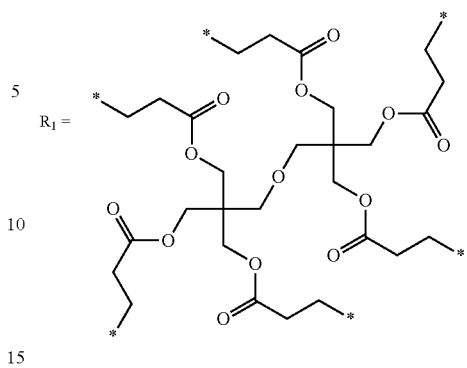

A-14 has the following structure with a weight average molecular weight of 3300 and an acid number of 36.3 mgKOH/g:

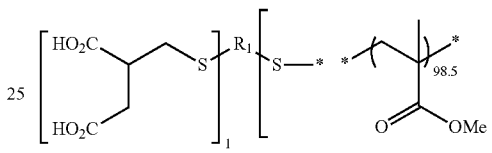

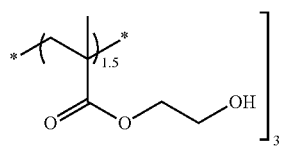

R₁ =

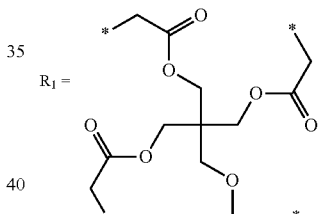

A-15 has the following structure with a weight average molecular weight of 2200 and an acid number of 51.3 mgKOH/g:

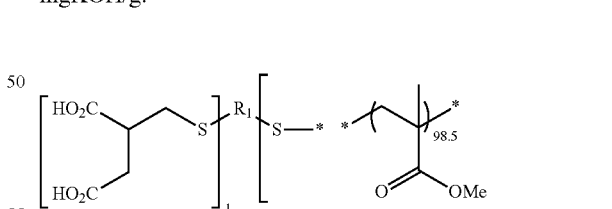

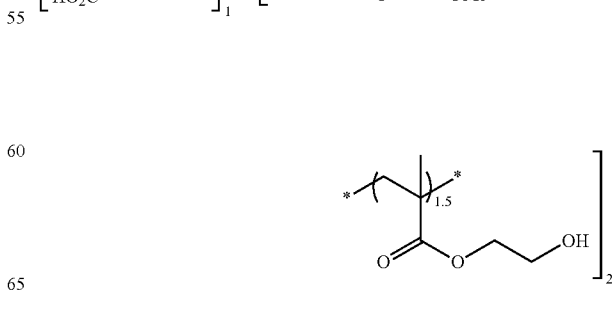

-continued

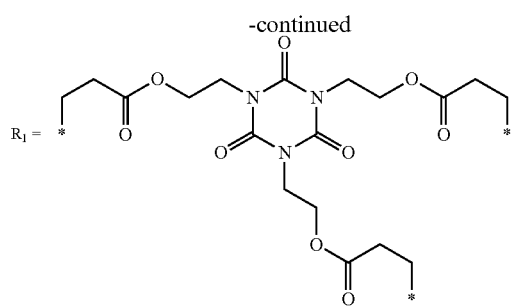

A-16 has the following structure with a weight average molecular weight of 1100 and an acid number of 105.3 mgKOH/g:

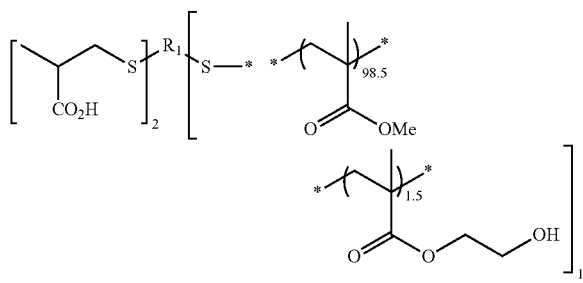

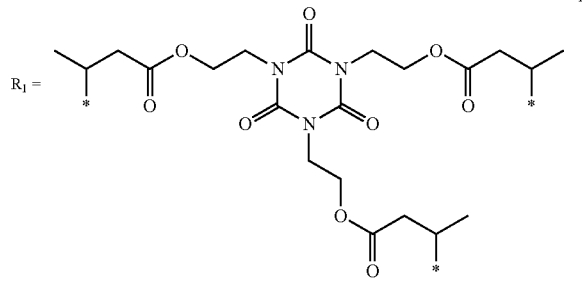

A-18 has the same structure as A-13 with a weight average molecular weight of 12600 and an acid number of 48.5 mgKOH/g;
A-20 has the same structure as A-2 with a weight average molecular weight of 9600 and an acid number of 10.4 mgKOH/g;
A-23 has the same structure as A-13 with a weight average molecular weight of 3500 and an acid number of 159.4 mgKOH/g;
A-24 has the same structure as A-13 with a weight average molecular weight of 3000 and an acid number of 187.1 mgKOH/g;
A-27 has the following structure with a weight average molecular weight of 3000 and an acid number of 37.3 mgKOH/g:

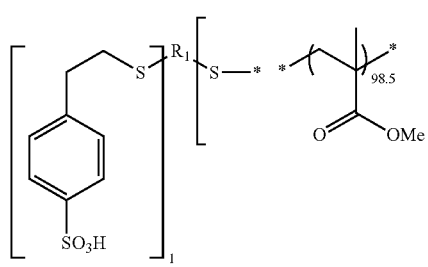

-continued

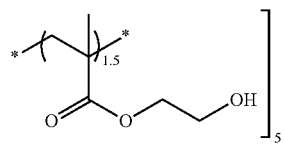

A-28 has the following structure with a weight average molecular weight of 2600 and an acid number of 43.1 mgKOH/g:

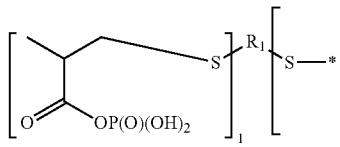

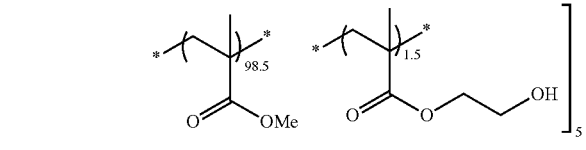

A-32 has the following structure with a weight average molecular weight of 5100 and an acid number of 22.0 mgKOH/g:

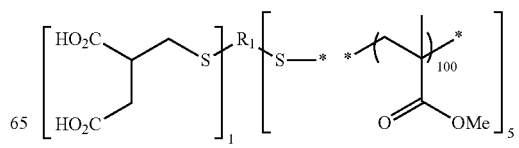

$R_1 =$ 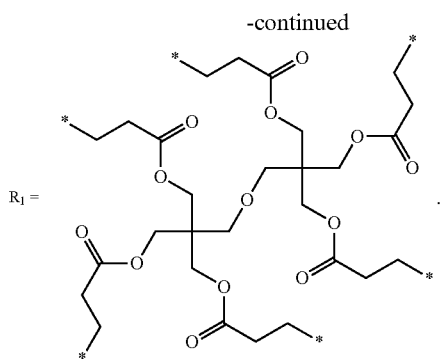

2. The magnetic coating composition according to claim 1, wherein, in formula (1), $P^1$ is a residue of a copolymer or a polymer of a vinyl monomer.

3. The magnetic coating composition according to claim 1, wherein, in formula (1), $P^1$ is a residue of a copolymer or a polymer of a (meth)acrylic acid ester.

4. The magnetic coating composition according to claim 1, which further comprises a curing agent.

5. The magnetic coating composition according to claim 4, wherein, in formula (1), $P^1$ comprises a functional group capable of undergoing a crosslinking reaction with the curing agent.

6. The magnetic coating composition according to claim 5, wherein the functional group capable of undergoing a crosslinking reaction is selected from the group consisting of a hydroxyl group, an amino group, a phenol group, and a carboxyl group.

7. The magnetic coating composition according to claim 4, wherein the curing agent is polyisocyanate.

8. The magnetic coating composition according to claim 1, wherein component (C) is ferromagnetic powder with an average particle size ranging from 10 nm to 50 nm.

9. The magnetic coating composition according to claim 1, wherein component (C) is ferromagnetic hexagonal ferrite powder.

10. The magnetic coating composition according to claim 1, wherein component (C) is ferromagnetic metal powder.

11. The magnetic coating composition according to claim 1, which comprises 2 to 30 weight parts of component (A) per 100 weight parts of component (C).

12. The magnetic coating composition according to claim 1, wherein component (D) comprises ketone solvent.

13. The magnetic coating composition according to claim 1, wherein component (B) is selected from the group consisting of polyurethane resin and vinyl chloride resin.

14. A magnetic recording medium, which comprises a magnetic layer formed of the magnetic coating composition according to claim 1 on a nonmagnetic support.

15. A magnetic coating composition according to claim 1, wherein the acid number is within a range of 10.4 to 159.4 mgKOH/g.

* * * * *